(12) United States Patent
    Chandler

(10) Patent No.: US 11,028,783 B2
(45) Date of Patent: *Jun. 8, 2021

(54) AUTOMATED TUNING OF GAS TURBINE COMBUSTION SYSTEMS

(71) Applicant: Gas Turbine Efficiency Sweden AB, Jarfalla (SE)

(72) Inventor: Christopher Chandler, Austin, TX (US)

(73) Assignee: Gas Turbine Efficiency Sweden AB, Jarfalla (SE)

(*) Notice: Subject to any disclaimer, the term of this patent is extended or adjusted under 35 U.S.C. 154(b) by 110 days.

This patent is subject to a terminal disclaimer.

(21) Appl. No.: 16/282,645

(22) Filed: Feb. 22, 2019

(65) Prior Publication Data
    US 2019/0186382 A1    Jun. 20, 2019

Related U.S. Application Data

(63) Continuation of application No. 14/992,539, filed on Jan. 11, 2016, now Pat. No. 10,260,428, which is a
(Continued)

(51) Int. Cl.
    *F02C 9/28*    (2006.01)
    *F23N 1/00*    (2006.01)
    (Continued)

(52) U.S. Cl.
    CPC ............... *F02C 9/28* (2013.01); *F23N 1/002* (2013.01); *F23N 5/003* (2013.01); *F23N 5/242* (2013.01);
    (Continued)

(58) Field of Classification Search
    None
    See application file for complete search history.

(56) References Cited

U.S. PATENT DOCUMENTS

| 3,842,597 A | 10/1974 | Ehrich |
| 3,866,109 A | 2/1975 | Reed et al. |

(Continued)

FOREIGN PATENT DOCUMENTS

| CN | 1148152 | 4/1997 |
| CN | 1611839 | 5/2005 |

(Continued)

OTHER PUBLICATIONS

Yukimoto et al. "A new PID controller tuning system and its application to a flue gas temperature control in a gas turbine power plant," Control Applications [Online] 1998, 2, pp. 1373-1377.
(Continued)

*Primary Examiner* — Michael Lebentritt
(74) *Attorney, Agent, or Firm* — DLA Piper LLP (US)

(57) ABSTRACT

The present disclosure provides a tuning system for tuning the operation of a gas turbine. The system comprises operational turbine controls for controlling operational control elements of the turbine, including at least one of turbine fuel distribution or the fuel temperature. The system also has a tuning controller communicating with the turbine controls. The tuning controller is configured to tune the operation of the turbine in accordance with the following steps: receiving operational data about the turbine, providing a hierarchy of tuning issues, determining whether sensed operational data is within predetermined operational limits and producing one or more indicators. If the operational data is not within predetermined operational limits, the tuning controller will rank the one or more indicators to determine dominant tuning concern, and tune the operation of the turbine based on dominant tuning concern. Also provided herein are a method and computer readable medium for tuning.

24 Claims, 19 Drawing Sheets

Related U.S. Application Data continuation of application No. 13/542,222, filed on Jul. 5, 2012, now Pat. No. 9,267,443, which is a continuation-in-part of application No. 12/463,060, filed on May 8, 2009, now Pat. No. 8,437,941.

(51) Int. Cl.
*F23N 5/00* (2006.01)
*F23N 5/24* (2006.01)
*F23R 3/34* (2006.01)
*G05B 13/02* (2006.01)

(52) U.S. Cl.
CPC ............. *F23R 3/34* (2013.01); *G05B 13/021* (2013.01); *F05D 2220/32* (2013.01); *F05D 2260/80* (2013.01); *F05D 2270/082* (2013.01); *F05D 2270/083* (2013.01); *F05D 2270/20* (2013.01); *F05D 2270/303* (2013.01); *F05D 2270/31* (2013.01); *F23N 2241/20* (2020.01); *F23R 2900/00013* (2013.01)

(56) References Cited

U.S. PATENT DOCUMENTS

| | | |
|---|---|---|
| 3,875,380 A | 4/1975 | Rankin |
| 3,898,439 A | 8/1975 | Reed et al. |
| 3,919,623 A | 11/1975 | Reuther |
| 3,924,140 A | 12/1975 | Yannone |
| 4,010,605 A | 3/1977 | Uram |
| 4,027,145 A | 5/1977 | McDonald et al. |
| 4,028,884 A | 6/1977 | Martz et al. |
| 4,031,404 A | 6/1977 | Martz et al. |
| 4,039,804 A | 8/1977 | Reed et al. |
| 4,039,846 A | 8/1977 | Vance |
| 4,051,669 A | 10/1977 | Yannone et al. |
| 4,115,998 A | 9/1978 | Gilbert et al. |
| 4,195,231 A | 3/1980 | Reed et al. |
| 4,201,923 A | 5/1980 | Reed et al. |
| 4,208,591 A | 6/1980 | Yannone et al. |
| 4,278,064 A | 7/1981 | Regueiro |
| 4,280,060 A | 7/1981 | Kure-Jensen et al. |
| 4,283,634 A | 8/1981 | Yannone et al. |
| 4,305,129 A | 12/1981 | Yannone et al. |
| 4,308,463 A | 12/1981 | Giras et al. |
| 4,314,441 A | 2/1982 | Yannone et al. |
| 4,319,320 A | 3/1982 | Sato et al. |
| 4,333,310 A | 6/1982 | Uram |
| 4,414,540 A | 11/1983 | Dickenson |
| 4,423,594 A | 1/1984 | Ellis |
| 4,445,180 A | 4/1984 | Davis et al. |
| 4,455,614 A | 6/1984 | Martz et al. |
| 4,716,858 A | 1/1988 | Bartels |
| 4,735,052 A | 4/1988 | Maeda et al. |
| 4,761,948 A | 8/1988 | Sood et al. |
| 4,811,555 A | 3/1989 | Bell |
| 4,845,940 A | 7/1989 | Beer |
| 4,893,467 A | 1/1990 | Woodson |
| 4,930,305 A | 6/1990 | Bell |
| 4,936,088 A | 6/1990 | Bell |
| 5,022,849 A | 6/1991 | Yoshii et al. |
| 5,024,055 A | 6/1991 | Kirikami et al. |
| 5,048,285 A | 9/1991 | Schmitt |
| 5,237,939 A | 8/1993 | Spokoyny et al. |
| 5,307,619 A | 5/1994 | McCarty et al. |
| 5,319,931 A | 6/1994 | Beebe et al. |
| 5,319,936 A | 6/1994 | Ikeda et al. |
| 5,339,635 A | 8/1994 | Iwai et al. |
| 5,349,812 A | 9/1994 | Taniguchi et al. |
| 5,365,732 A | 11/1994 | Correa |
| 5,367,470 A | 11/1994 | Lang |
| 5,423,175 A | 6/1995 | Beebe et al. |
| 5,450,724 A | 9/1995 | Kesseli et al. |
| 5,480,298 A | 1/1996 | Brown |
| 5,487,265 A | 1/1996 | Rajamani et al. |
| 5,490,377 A | 2/1996 | Janes |
| 5,491,970 A | 2/1996 | Davis, Jr. et al. |
| 5,517,424 A | 5/1996 | Marcelle et al. |
| 5,533,329 A | 7/1996 | Ohyama et al. |
| 5,551,228 A | 9/1996 | Mick et al. |
| 5,564,270 A | 10/1996 | Kesseli et al. |
| 5,609,655 A | 3/1997 | Kesseli et al. |
| 5,636,507 A | 6/1997 | Rajamani et al. |
| 5,661,969 A | 9/1997 | Beebe et al. |
| 5,706,643 A | 1/1998 | Snyder et al. |
| 5,719,791 A | 2/1998 | Neumeier et al. |
| 5,722,230 A | 3/1998 | Cohen et al. |
| 5,729,968 A | 3/1998 | Cohen et al. |
| 5,784,300 A | 7/1998 | Neumeier et al. |
| 5,790,420 A | 8/1998 | Lang |
| 5,791,889 A | 8/1998 | Gemmen et al. |
| 5,794,446 A | 8/1998 | Earley et al. |
| 5,826,429 A | 10/1998 | Beebe et al. |
| 5,845,230 A | 12/1998 | Lamberson |
| 5,847,353 A | 12/1998 | Titus et al. |
| 5,867,977 A | 2/1999 | Zachary et al. |
| 5,878,566 A | 3/1999 | Endo et al. |
| 5,896,736 A | 4/1999 | Rajamani |
| 5,924,275 A | 7/1999 | Cohen et al. |
| 5,930,990 A | 8/1999 | Zachary et al. |
| 5,943,866 A | 8/1999 | Lovett et al. |
| 6,055,808 A | 5/2000 | Poola et al. |
| 6,066,825 A | 5/2000 | Titus et al. |
| 6,071,114 A | 6/2000 | Cusack et al. |
| 6,082,092 A | 7/2000 | Vandervort |
| 6,092,362 A | 7/2000 | Nagafuchi et al. |
| 6,125,625 A | 10/2000 | Lipinski et al. |
| 6,138,081 A | 10/2000 | Olejack et al. |
| 6,145,297 A | 11/2000 | Nagafuchi et al. |
| 6,164,055 A | 12/2000 | Lovett et al. |
| 6,195,607 B1 | 2/2001 | Rajamani et al. |
| 6,196,000 B1 | 3/2001 | Fassbender |
| 6,202,401 B1 | 3/2001 | Seume et al. |
| 6,205,765 B1 | 3/2001 | Iasillo et al. |
| 6,250,063 B1 | 6/2001 | Davis, Jr. et al. |
| 6,269,299 B1 | 7/2001 | Blotenberg |
| 6,287,111 B1 | 9/2001 | Gensler |
| 6,293,105 B1 | 9/2001 | Claesson et al. |
| 6,298,718 B1 | 10/2001 | Wang |
| 6,324,827 B1 | 12/2001 | Basu et al. |
| 6,338,240 B1 | 1/2002 | Endo et al. |
| 6,341,519 B1 | 1/2002 | Khesin et al. |
| 6,343,251 B1 | 1/2002 | Herron et al. |
| 6,354,071 B2 | 3/2002 | Tegel et al. |
| 6,363,330 B1 | 3/2002 | Alag et al. |
| 6,389,330 B1 | 5/2002 | Khesin |
| 6,397,602 B2 | 6/2002 | Vandervort et al. |
| 6,405,523 B1 | 6/2002 | Foust et al. |
| 6,408,611 B1 | 6/2002 | Keller et al. |
| 6,412,271 B1 | 7/2002 | Maker et al. |
| 6,418,726 B1 | 7/2002 | Foust et al. |
| 6,460,339 B2 | 10/2002 | Nishida et al. |
| 6,460,341 B1 | 10/2002 | Gutmark et al. |
| 6,461,144 B1 | 10/2002 | Gutmark et al. |
| 6,464,489 B1 | 10/2002 | Gutmark et al. |
| 6,466,859 B1 | 10/2002 | Fujime |
| 6,480,810 B1 | 11/2002 | Cardella et al. |
| 6,484,489 B1 | 11/2002 | Foust et al. |
| 6,522,991 B2 | 2/2003 | Banaszuk et al. |
| 6,522,994 B1 | 2/2003 | Lang |
| 6,529,849 B2 | 3/2003 | Umezawa et al. |
| 6,556,956 B1 | 4/2003 | Hunt |
| 6,560,563 B1 | 5/2003 | Lang |
| 6,568,166 B2 | 5/2003 | Jay et al. |
| 6,584,429 B1 | 6/2003 | Lang |
| 6,598,383 B1 | 7/2003 | Vandervort et al. |
| 6,612,112 B2 | 9/2003 | Gilbreth et al. |
| 6,616,901 B1 | 9/2003 | Lagana et al. |
| 6,640,544 B2 | 11/2003 | Suenaga et al. |
| 6,651,035 B1 | 11/2003 | Lang |
| 6,657,332 B2 | 12/2003 | Balas |
| 6,672,071 B2 | 1/2004 | Woltmann |
| 6,691,054 B1 | 2/2004 | Lang |
| 6,694,900 B2 | 2/2004 | Lissianski et al. |

(56) References Cited

U.S. PATENT DOCUMENTS

| | | |
|---|---|---|
| 6,704,620 B1 | 3/2004 | Kutzner et al. |
| 6,714,877 B1 | 3/2004 | Lang |
| 6,721,631 B2 | 4/2004 | Shimizu et al. |
| 6,721,649 B2 | 4/2004 | Knott et al. |
| 6,722,135 B2 | 4/2004 | Davis, Jr. et al. |
| 6,725,665 B2 | 4/2004 | Tuschy et al. |
| 6,742,341 B2 | 6/2004 | Ryan et al. |
| 6,745,152 B1 | 6/2004 | Lang |
| 6,757,619 B2 | 6/2004 | Zison et al. |
| 6,760,659 B1 | 7/2004 | Cowen |
| 6,760,689 B2 | 7/2004 | Follin et al. |
| 6,766,224 B2 | 7/2004 | Tanaka |
| 6,772,583 B2 | 8/2004 | Bland |
| 6,789,000 B1 | 9/2004 | Munson, Jr. |
| 6,799,146 B1 | 9/2004 | Lang |
| 6,810,358 B1 | 10/2004 | Lang et al. |
| 6,810,655 B2 | 11/2004 | Davis, Jr. et al. |
| 6,823,675 B2 | 11/2004 | Brunell |
| 6,834,226 B2 | 12/2004 | Hartzheim |
| 6,839,613 B2 | 1/2005 | McCarthy et al. |
| 6,840,046 B2 | 1/2005 | Paschereit et al. |
| 6,845,300 B2 | 1/2005 | Haghgooie et al. |
| 6,862,889 B2 | 3/2005 | Held et al. |
| 6,865,889 B2 | 3/2005 | Mancini et al. |
| 6,868,368 B1 | 3/2005 | Lang |
| 6,871,501 B2 | 3/2005 | Bibler et al. |
| 6,873,933 B1 | 3/2005 | Lang |
| 6,877,307 B2 | 4/2005 | Ryan et al. |
| 6,880,325 B2 | 4/2005 | Aoyama |
| 6,883,301 B2 | 4/2005 | Woltmann |
| 6,898,488 B2 | 5/2005 | Kusaka et al. |
| 6,910,335 B2 | 6/2005 | Viteri et al. |
| 6,912,855 B2 | 7/2005 | Bescherer et al. |
| 6,912,856 B2 | 7/2005 | Morgan et al. |
| 6,912,889 B2 | 7/2005 | Staphanos et al. |
| 6,918,253 B2 | 7/2005 | Fassbender |
| 6,920,761 B2 | 7/2005 | Laper |
| 6,931,853 B2 | 8/2005 | Dawson |
| 6,941,217 B1 | 9/2005 | Munson, Jr. |
| 6,952,639 B2 | 10/2005 | Kumar et al. |
| 6,952,642 B1 | 10/2005 | Cowen |
| 6,955,039 B2 | 10/2005 | Nomura et al. |
| 6,965,826 B2 | 11/2005 | Andres |
| 6,968,693 B2 | 11/2005 | Colibaba-Evulet et al. |
| 6,973,376 B2 | 12/2005 | Kusaka et al. |
| 6,973,790 B2 | 12/2005 | Suenaga et al. |
| 6,973,791 B2 | 12/2005 | Handelsman et al. |
| 6,976,351 B2 | 12/2005 | Catharine et al. |
| 6,986,254 B2 | 1/2006 | Stuttaford et al. |
| 6,989,693 B2 | 1/2006 | Kuo et al. |
| 6,990,432 B1 | 1/2006 | McCarthy et al. |
| 6,996,991 B2 | 2/2006 | Gadde et al. |
| 7,006,898 B2 | 2/2006 | Barbir et al. |
| 7,007,487 B2 | 3/2006 | Belokon et al. |
| 7,039,555 B2 | 5/2006 | Lang |
| 7,047,747 B2 | 5/2006 | Tanaka |
| 7,050,943 B2 | 5/2006 | Kauffman et al. |
| 7,059,135 B2 | 6/2006 | Held et al. |
| 7,062,389 B2 | 6/2006 | Johnson et al. |
| 7,065,471 B2 | 6/2006 | Gotoh et al. |
| 7,065,472 B2 | 6/2006 | Hayashi et al. |
| 7,089,746 B2 | 8/2006 | Lieuwen et al. |
| 7,100,357 B2 | 9/2006 | Morgan et al. |
| 7,107,773 B2 | 9/2006 | Little |
| 7,111,463 B2 | 9/2006 | Sprouse et al. |
| 7,127,329 B2 | 10/2006 | Kusaka et al. |
| 7,127,898 B2 | 10/2006 | Healy |
| 7,143,572 B2 | 12/2006 | Ooka et al. |
| 7,161,678 B2 | 1/2007 | Schultz |
| 7,162,875 B2 | 1/2007 | Fletcher et al. |
| 7,177,728 B2 | 2/2007 | Gardner |
| 7,181,320 B2 | 2/2007 | Whiffen et al. |
| 7,181,321 B2 | 2/2007 | Schlicker et al. |
| 7,181,916 B2 | 2/2007 | Ziminsky et al. |
| 7,185,494 B2 | 3/2007 | Ziminsky et al. |
| 7,188,019 B2 | 3/2007 | Nomura et al. |
| 7,188,465 B2 | 3/2007 | Kothnur et al. |
| 7,190,149 B2 | 3/2007 | Huff et al. |
| 7,204,133 B2 | 4/2007 | Benson et al. |
| 7,210,297 B2 | 5/2007 | Shah et al. |
| 7,216,486 B2 | 5/2007 | Doebbeling et al. |
| 7,219,040 B2 | 5/2007 | Renou et al. |
| 7,234,305 B2 | 6/2007 | Nomura et al. |
| 7,237,385 B2 | 7/2007 | Carrea |
| 7,246,002 B2 | 7/2007 | Healy et al. |
| 7,246,024 B2 | 7/2007 | Muramatsu et al. |
| 7,249,462 B2 | 7/2007 | Aumont et al. |
| 7,260,466 B2 | 8/2007 | Fujii |
| 7,260,935 B2 | 8/2007 | Colibaba-Evulet et al. |
| 7,260,937 B2 | 8/2007 | Kothnur et al. |
| 7,269,939 B2 | 9/2007 | Kothnur et al. |
| 7,269,952 B2 | 9/2007 | Arar et al. |
| 7,269,953 B2 | 9/2007 | Gadde et al. |
| 7,275,025 B2 | 9/2007 | Chan et al. |
| 7,278,266 B2 | 10/2007 | Taware et al. |
| 7,284,378 B2 | 10/2007 | Amond, III et al. |
| 7,288,921 B2 | 10/2007 | Huff et al. |
| 7,299,279 B2 | 11/2007 | Sadaghiany |
| 7,302,334 B2 | 11/2007 | Hook et al. |
| 7,320,213 B2 | 1/2008 | Shah et al. |
| 7,334,413 B2 | 2/2008 | Myhre |
| 7,349,765 B2 | 3/2008 | Reaume et al. |
| 7,353,084 B2 | 4/2008 | Schaper et al. |
| 7,356,383 B2 | 4/2008 | Pechtl et al. |
| 7,368,827 B2 | 5/2008 | Kulkarni et al. |
| 7,369,932 B2 | 5/2008 | Kim et al. |
| 7,377,036 B2 | 5/2008 | Johnson et al. |
| 7,385,300 B2 | 6/2008 | Huff et al. |
| 7,389,151 B2 | 6/2008 | Badami et al. |
| 7,389,643 B2 | 6/2008 | Simons et al. |
| 7,406,820 B2 | 8/2008 | Critchley et al. |
| 7,409,855 B2 | 8/2008 | Flint |
| 7,415,779 B2 | 8/2008 | St. Louis et al. |
| 7,435,080 B2 | 10/2008 | Joklik et al. |
| 7,437,871 B2 | 10/2008 | Cook |
| 7,441,398 B2 | 10/2008 | Ziminsky et al. |
| 7,441,448 B2 | 10/2008 | Volponi |
| 7,451,601 B2 | 11/2008 | Taware et al. |
| 7,456,517 B2 | 11/2008 | Campbell et al. |
| 7,457,688 B2 | 11/2008 | Szepek et al. |
| 7,457,710 B2 | 11/2008 | Schuermans et al. |
| 7,461,509 B2 | 12/2008 | Mick et al. |
| 7,471,996 B2 | 12/2008 | Bartel |
| 7,474,080 B2 | 1/2009 | Huff et al. |
| 7,478,525 B2 | 1/2009 | Iya et al. |
| 7,481,100 B2 | 1/2009 | Ponziani et al. |
| 7,484,369 B2 | 2/2009 | Myhre |
| 7,486,864 B2 | 2/2009 | Diatzikis |
| 7,487,642 B2 | 2/2009 | Joshi et al. |
| 7,489,835 B1 | 2/2009 | Xia et al. |
| 7,490,596 B2 | 2/2009 | Yasui et al. |
| 7,493,207 B2 | 2/2009 | Yasui et al. |
| 7,493,752 B2 | 2/2009 | Horswill et al. |
| 7,503,177 B2 | 3/2009 | Bland et al. |
| 7,509,810 B2 | 3/2009 | Smith et al. |
| 7,512,476 B2 | 3/2009 | Rosi et al. |
| 7,513,099 B2 | 4/2009 | Nuding et al. |
| 7,515,995 B2 | 4/2009 | Toth |
| 7,530,216 B2 | 5/2009 | Tsuzuki et al. |
| 7,530,260 B2 | 5/2009 | Dooley |
| 7,534,033 B2 | 5/2009 | Prinz et al. |
| 7,536,992 B1 | 5/2009 | Wieshuber et al. |
| 7,546,741 B2 | 6/2009 | Sasao et al. |
| 7,562,532 B2 | 7/2009 | Diaz et al. |
| 7,565,238 B2 | 7/2009 | Nakagawa et al. |
| 7,565,792 B2 | 7/2009 | Tanaka et al. |
| 7,565,805 B2 | 7/2009 | Steber et al. |
| 7,568,349 B2 | 8/2009 | Hadley |
| 7,571,045 B2 | 8/2009 | Muramatsu et al. |
| 7,577,549 B2 | 8/2009 | Osborn et al. |
| 7,582,359 B2 | 9/2009 | Sabol et al. |
| 7,584,617 B2 | 9/2009 | Bland et al. |
| 7,591,135 B2 | 9/2009 | Stewart |
| 7,600,369 B2 | 10/2009 | Tanaka et al. |

(56) References Cited

U.S. PATENT DOCUMENTS

| | | | |
|---|---|---|---|
| 7,610,745 | B2 | 11/2009 | Fujii et al. |
| 7,610,746 | B2 | 11/2009 | Fujii et al. |
| 7,617,686 | B2 | 11/2009 | Lilley et al. |
| 7,617,687 | B2 | 11/2009 | West et al. |
| 7,620,461 | B2 | 11/2009 | Frederick et al. |
| 7,623,999 | B2 | 11/2009 | Clayton |
| 7,628,062 | B2 | 12/2009 | Healy et al. |
| 7,628,078 | B2 | 12/2009 | Matsui et al. |
| 7,630,820 | B2 | 12/2009 | Sims et al. |
| 7,632,059 | B2 | 12/2009 | Tisenchek et al. |
| 7,640,725 | B2 | 1/2010 | Bland et al. |
| 7,640,793 | B2 | 1/2010 | McCall et al. |
| 7,644,574 | B2 | 1/2010 | Feiz |
| 7,644,577 | B2 | 1/2010 | Linna et al. |
| 7,647,778 | B2 | 1/2010 | Zewde et al. |
| 7,650,050 | B2 | 1/2010 | Haffner et al. |
| 7,665,670 | B2 | 2/2010 | Ahmed |
| 7,677,075 | B2 | 3/2010 | Nies |
| 7,681,440 | B2 | 3/2010 | Thomassin et al. |
| 7,684,880 | B2 | 3/2010 | Bach |
| 7,690,204 | B2 | 4/2010 | Drnevich et al. |
| 7,692,324 | B2 | 4/2010 | Malakhova et al. |
| 7,693,147 | B2 | 4/2010 | Williams et al. |
| 7,693,643 | B2 | 4/2010 | Kim et al. |
| 7,698,030 | B2 | 4/2010 | Martin |
| 7,698,897 | B2 | 4/2010 | Rowe et al. |
| 7,702,447 | B2 | 4/2010 | Volponi |
| 7,703,288 | B2 | 4/2010 | Rogers |
| 7,707,833 | B1 | 5/2010 | Bland et al. |
| 7,712,313 | B2 | 5/2010 | Kojovic et al. |
| 7,730,726 | B2 | 6/2010 | Asti et al. |
| 7,751,943 | B2 | 7/2010 | Bollhalder et al. |
| 7,756,626 | B2 | 7/2010 | Fujii et al. |
| 7,757,491 | B2 | 7/2010 | Hessler |
| 7,765,856 | B2 | 8/2010 | WIlbraham |
| 7,769,507 | B2 | 8/2010 | Volponi et al. |
| 7,775,052 | B2 | 8/2010 | Cornwell et al. |
| 7,788,014 | B2 | 8/2010 | Volponi |
| 7,797,113 | B2 | 9/2010 | Yoshida et al. |
| 7,805,922 | B2 | 10/2010 | Bland |
| 7,818,970 | B2 | 10/2010 | Price et al. |
| 7,822,512 | B2 | 10/2010 | Thatcher et al. |
| 7,822,576 | B2 | 10/2010 | Flint et al. |
| 7,823,388 | B2 | 11/2010 | Murakami |
| 7,826,954 | B2 | 11/2010 | Muramatsu et al. |
| 7,832,210 | B2 | 11/2010 | Fecamp et al. |
| 7,836,676 | B2 | 11/2010 | Futa, Jr. et al. |
| 7,837,429 | B2 | 11/2010 | Zhang et al. |
| 7,840,336 | B2 | 11/2010 | Muramatsu et al. |
| 7,841,180 | B2 | 11/2010 | Kraemer et al. |
| 7,841,317 | B2 | 11/2010 | Williams et al. |
| 7,853,433 | B2 | 12/2010 | He et al. |
| 7,853,441 | B2 | 12/2010 | Volponi et al. |
| 7,861,578 | B2 | 1/2011 | Adibhatla et al. |
| 7,871,237 | B2 | 1/2011 | Bunce et al. |
| 7,878,004 | B2 | 2/2011 | Davies et al. |
| 7,886,875 | B2 | 2/2011 | Shevchencko et al. |
| 7,895,821 | B2 | 3/2011 | Annigeri et al. |
| 7,908,072 | B2 | 3/2011 | Tonno et al. |
| 7,927,095 | B1 | 4/2011 | Chorpening et al. |
| 7,942,038 | B2 | 5/2011 | Ziminsky et al. |
| 7,945,523 | B2 | 5/2011 | Hofmann et al. |
| 7,950,216 | B2 | 5/2011 | Dooley et al. |
| 7,957,845 | B2 | 6/2011 | Chen |
| 7,966,100 | B2 | 6/2011 | Beekhuis |
| 7,966,801 | B2 | 6/2011 | Umeh et al. |
| 7,966,802 | B2 | 6/2011 | Szepek et al. |
| 7,966,804 | B2 | 6/2011 | Snow |
| 7,966,834 | B2 | 6/2011 | Myhre |
| 7,966,995 | B2 | 6/2011 | Futa, Jr. et al. |
| 7,970,570 | B2 | 6/2011 | Lynch et al. |
| 7,975,533 | B2 | 7/2011 | Andrie |
| 7,980,082 | B2 | 7/2011 | Ziminsky et al. |
| 7,983,829 | B2 | 7/2011 | Muramatsu et al. |
| 7,997,083 | B2 | 8/2011 | Meadows et al. |
| 8,001,761 | B2 | 8/2011 | Myers, Jr. et al. |
| 8,005,575 | B2 | 8/2011 | Kirchhof |
| 8,014,929 | B2 | 9/2011 | Page et al. |
| 8,015,791 | B2 | 9/2011 | Finkbeiner |
| 8,015,792 | B2 | 9/2011 | Raver |
| 8,018,590 | B2 | 9/2011 | Davis, Jr. et al. |
| 8,024,934 | B2 | 9/2011 | Abreu et al. |
| 8,024,964 | B2 | 9/2011 | Healy et al. |
| 8,028,512 | B2 | 10/2011 | Mendoza et al. |
| 8,033,117 | B2 | 10/2011 | Ziminsky et al. |
| 8,037,688 | B2 | 10/2011 | Hagen et al. |
| 8,042,340 | B2 | 10/2011 | Ma et al. |
| 8,056,062 | B2 | 11/2011 | Bowers et al. |
| 8,056,317 | B2 | 11/2011 | Feiz |
| 8,061,118 | B2 | 11/2011 | Kothnur et al. |
| 8,068,997 | B2 | 11/2011 | Ling et al. |
| 8,099,181 | B2 | 1/2012 | Sterzing et al. |
| 8,145,403 | B2 | 3/2012 | Fuller et al. |
| 8,417,433 | B2 | 4/2013 | Gauthier |
| 8,457,936 | B2 | 6/2013 | Harris |
| 9,097,185 | B2 | 8/2015 | Demougeot |
| 9,267,443 | B2 | 2/2016 | Chandler |
| 9,494,492 | B2 | 11/2016 | Brunschwig |
| 10,260,428 | B2 * | 4/2019 | Chandler .................. F23R 3/34 |
| 2002/0084702 | A1 | 7/2002 | Balas |
| 2002/0099474 | A1 | 7/2002 | Khesin |
| 2002/0107614 | A1 | 8/2002 | Tanaka |
| 2002/0142257 | A1 | 10/2002 | Eroglu et al. |
| 2002/0198629 | A1 | 12/2002 | Ellis |
| 2003/0009401 | A1 | 1/2003 | Ellis |
| 2003/0018394 | A1 | 1/2003 | McCarthy et al. |
| 2003/0036820 | A1 | 2/2003 | Yellepeddy et al. |
| 2003/0037550 | A1 | 2/2003 | Fassbender |
| 2003/0056517 | A1 | 3/2003 | Brushwood et al. |
| 2003/0093184 | A1 | 5/2003 | Tanaka |
| 2003/0120444 | A1 | 6/2003 | Zison et al. |
| 2003/0144787 | A1 | 7/2003 | Davis, Jr. et al. |
| 2003/0211432 | A1 | 11/2003 | Gutmark et al. |
| 2003/0233831 | A1 | 12/2003 | Suenaga et al. |
| 2004/0011051 | A1 | 1/2004 | Ryan et al. |
| 2004/0025512 | A1 | 2/2004 | Davis, Jr. et al. |
| 2004/0088060 | A1 | 5/2004 | Renou et al. |
| 2004/0102872 | A1 | 5/2004 | Schick et al. |
| 2004/0103068 | A1 | 5/2004 | Eker et al. |
| 2004/0128111 | A1 | 7/2004 | Lang |
| 2004/0128266 | A1 | 7/2004 | Yellepeddy et al. |
| 2004/0159142 | A1 | 8/2004 | Knott et al. |
| 2004/0191914 | A1 | 9/2004 | Widmer et al. |
| 2004/0194468 | A1 | 10/2004 | Ryan et al. |
| 2004/0197239 | A1 | 10/2004 | Mirkovic et al. |
| 2004/0249515 | A1 | 12/2004 | Johnson et al. |
| 2004/0255595 | A1 | 12/2004 | Morgan et al. |
| 2005/0011179 | A1 | 1/2005 | Ooka et al. |
| 2005/0021710 | A1 | 1/2005 | Johnson et al. |
| 2005/0022499 | A1 | 2/2005 | Belokon et al. |
| 2005/0038570 | A1 | 2/2005 | Grauer |
| 2005/0049775 | A1 | 3/2005 | Mooney |
| 2005/0061004 | A1 | 3/2005 | Colibaba-Evulet et al. |
| 2005/0107941 | A1 | 5/2005 | Healy |
| 2005/0107942 | A1 | 5/2005 | Nomura et al. |
| 2005/0114010 | A1 | 5/2005 | Healy et al. |
| 2005/0143865 | A1 | 6/2005 | Gardner |
| 2005/0144955 | A1 | 7/2005 | Handelsman et al. |
| 2005/0159849 | A9 | 7/2005 | Johnson et al. |
| 2005/0160717 | A1 | 7/2005 | Sprouse et al. |
| 2005/0188745 | A1 | 9/2005 | Staphanos et al. |
| 2005/0203670 | A1 | 9/2005 | Kusaka et al. |
| 2005/0217276 | A1 | 10/2005 | Colibaba-Evulet et al. |
| 2005/0223713 | A1 | 10/2005 | Ziminsky et al. |
| 2005/0247064 | A1 | 11/2005 | Lieuwen |
| 2005/0257514 | A1 | 11/2005 | Morgan et al. |
| 2005/0267642 | A1 | 12/2005 | Whiffen et al. |
| 2005/0268617 | A1 | 12/2005 | Amond, III et al. |
| 2005/0274115 | A1 | 12/2005 | Pearce |
| 2005/0276306 | A1 | 12/2005 | Mick et al. |
| 2005/0278076 | A1 | 12/2005 | Barbir et al. |
| 2006/0040225 | A1 | 2/2006 | Garay et al. |
| 2006/0041368 | A1 | 2/2006 | Williams et al. |
| 2006/0080965 | A1 | 4/2006 | Healy |

(56) References Cited

U.S. PATENT DOCUMENTS

| | | |
|---|---|---|
| 2006/0106501 A1 | 5/2006 | Gomer et al. |
| 2006/0137353 A1 | 6/2006 | Lieuwen et al. |
| 2006/0149423 A1 | 7/2006 | Barnicki et al. |
| 2006/0178782 A1 | 8/2006 | Pechtl et al. |
| 2006/0190139 A1 | 8/2006 | Reaume et al. |
| 2006/0228596 A1 | 10/2006 | Campbell et al. |
| 2006/0230743 A1 | 10/2006 | Sprouse et al. |
| 2006/0254279 A1 | 11/2006 | Taware et al. |
| 2006/0260319 A1 | 11/2006 | Ziminksy et al. |
| 2006/0288706 A1 | 12/2006 | Ziminksy et al. |
| 2007/0021899 A1 | 1/2007 | Griffin et al. |
| 2007/0055392 A1 | 3/2007 | D'Amato et al. |
| 2007/0067068 A1 | 3/2007 | Havlena et al. |
| 2007/0074519 A1 | 4/2007 | Hadley |
| 2007/0084217 A1 | 4/2007 | Nicholls |
| 2007/0089425 A1 | 4/2007 | Motter et al. |
| 2007/0113560 A1 | 5/2007 | Steber et al. |
| 2007/0119147 A1 | 5/2007 | Cornwell et al. |
| 2007/0119178 A1 | 5/2007 | Berenbrink et al. |
| 2007/0125088 A1 | 6/2007 | Kothnur et al. |
| 2007/0141417 A1 | 6/2007 | Bitoh |
| 2007/0142975 A1 | 6/2007 | Piche |
| 2007/0151252 A1 | 7/2007 | Cornwell et al. |
| 2007/0151257 A1 | 7/2007 | Maier et al. |
| 2007/0157620 A1 | 7/2007 | Healy et al. |
| 2007/0157624 A1 | 7/2007 | Bland et al. |
| 2007/0162189 A1 | 7/2007 | Huff et al. |
| 2007/0163267 A1 | 7/2007 | Flohr et al. |
| 2007/0180831 A1 | 8/2007 | Bland |
| 2007/0186875 A1 | 8/2007 | Jonson |
| 2007/0198132 A1 | 8/2007 | Yamamoto et al. |
| 2007/0213878 A1 | 9/2007 | Chen |
| 2007/0214796 A1 | 9/2007 | Bland et al. |
| 2007/0214797 A1 | 9/2007 | Bland et al. |
| 2007/0214798 A1 | 9/2007 | Frevel |
| 2007/0220896 A1 | 9/2007 | Varatharajan et al. |
| 2007/0227148 A1 | 10/2007 | Bland et al. |
| 2007/0227155 A1 | 10/2007 | Nemet et al. |
| 2007/0240648 A1 | 10/2007 | Badami et al. |
| 2007/0245707 A1 | 10/2007 | Pashley |
| 2007/0255459 A1 | 11/2007 | Althaus |
| 2007/0267997 A1 | 11/2007 | Kanazawa et al. |
| 2007/0271024 A1 | 11/2007 | Fujii et al. |
| 2007/0271927 A1 | 11/2007 | Myers et al. |
| 2007/0298295 A1 | 12/2007 | Daly et al. |
| 2008/0000214 A1 | 1/2008 | Kothnur et al. |
| 2008/0004721 A1 | 1/2008 | Huff et al. |
| 2008/0016875 A1 | 1/2008 | Ryan et al. |
| 2008/0016876 A1 | 1/2008 | Colibaba-Evulet et al. |
| 2008/0034731 A1 | 2/2008 | Pashley |
| 2008/0047275 A1 | 2/2008 | Ziminksy et al. |
| 2008/0071427 A1 | 3/2008 | Szepek et al. |
| 2008/0083228 A1 | 4/2008 | Myhre |
| 2008/0098746 A1 | 5/2008 | Iasillo et al. |
| 2008/0118343 A1 | 5/2008 | Arthur et al. |
| 2008/0134684 A1 | 6/2008 | Umeh et al. |
| 2008/0141643 A1 | 6/2008 | Varatharajan et al. |
| 2008/0154474 A1 | 6/2008 | Iasillo et al. |
| 2008/0177456 A1 | 7/2008 | Hill et al. |
| 2008/0177505 A1 | 7/2008 | Volponi |
| 2008/0243352 A1 | 10/2008 | Healy |
| 2008/0245980 A1 | 10/2008 | Diatzikis |
| 2008/0260519 A1 | 10/2008 | Dooley |
| 2008/0264034 A1 | 10/2008 | Iya et al. |
| 2008/0270003 A1 | 10/2008 | Sims et al. |
| 2008/0281483 A1 | 11/2008 | Litt |
| 2008/0281562 A1 | 11/2008 | Chou et al. |
| 2008/0288120 A1 | 11/2008 | Lindenmuth et al. |
| 2008/0288928 A1 | 11/2008 | Bowers |
| 2008/0289314 A1 | 11/2008 | Snider et al. |
| 2008/0301499 A1 | 12/2008 | Grichnik |
| 2009/0005950 A1 | 1/2009 | Scalia, Jr. |
| 2009/0005951 A1 | 1/2009 | Frederick, II et al. |
| 2009/0005952 A1 | 1/2009 | Tonno et al. |
| 2009/0007564 A1 | 1/2009 | Suzuki et al. |
| 2009/0037036 A1 | 2/2009 | Nguyen et al. |
| 2009/0042151 A1 | 2/2009 | Joklik et al. |
| 2009/0043485 A1 | 2/2009 | Banks |
| 2009/0044513 A1 | 2/2009 | Fuller et al. |
| 2009/0046762 A1 | 2/2009 | Henshaw et al. |
| 2009/0055070 A1 | 2/2009 | De et al. |
| 2009/0055071 A1 | 2/2009 | Way et al. |
| 2009/0055130 A1 | 2/2009 | Pandey et al. |
| 2009/0055145 A1 | 2/2009 | Volponi et al. |
| 2009/0071118 A1 | 3/2009 | Ma et al. |
| 2009/0071442 A1 | 3/2009 | Emo et al. |
| 2009/0082919 A1 | 3/2009 | Hershey et al. |
| 2009/0105852 A1 | 4/2009 | Wintrich et al. |
| 2009/0112441 A1 | 4/2009 | Perschi et al. |
| 2009/0125207 A1 | 5/2009 | Nomura et al. |
| 2009/0126367 A1 | 5/2009 | Chhabra et al. |
| 2009/0132145 A1 | 5/2009 | Angeby |
| 2009/0138170 A1 | 5/2009 | Nemet et al. |
| 2009/0141349 A1 | 6/2009 | Myhre |
| 2009/0142717 A1 | 6/2009 | Lavelle |
| 2009/0150040 A1 | 6/2009 | Rofka |
| 2009/0182441 A1 | 7/2009 | Wintrich et al. |
| 2009/0183551 A1 | 7/2009 | Fattic et al. |
| 2009/0193788 A1 | 8/2009 | Szepek et al. |
| 2009/0222187 A1 | 9/2009 | Martling et al. |
| 2009/0223210 A1 | 9/2009 | Klejeski et al. |
| 2009/0223225 A1 | 9/2009 | Kraemer et al. |
| 2009/0226327 A1 | 9/2009 | Little et al. |
| 2009/0234554 A1 | 9/2009 | Buehman |
| 2009/0265049 A1 | 10/2009 | Wise et al. |
| 2009/0266150 A1 | 10/2009 | Novis |
| 2009/0271149 A1 | 10/2009 | Brown |
| 2009/0271340 A1 | 10/2009 | Schneegass et al. |
| 2009/0292437 A1 | 11/2009 | Cloft |
| 2009/0293597 A1 | 12/2009 | Andrie |
| 2009/0301097 A1 | 12/2009 | Deuker et al. |
| 2009/0313056 A1 | 12/2009 | Beekhuis |
| 2009/0320492 A1 | 12/2009 | Carin et al. |
| 2009/0326781 A1 | 12/2009 | Mukavetz et al. |
| 2009/0326782 A1 | 12/2009 | Nunn |
| 2009/0326784 A1 | 12/2009 | Tanner et al. |
| 2010/0011851 A1 | 1/2010 | Healy et al. |
| 2010/0018183 A1 | 1/2010 | Feiz |
| 2010/0024393 A1 | 2/2010 | Chi et al. |
| 2010/0024536 A1 | 2/2010 | Adibhatla et al. |
| 2010/0031633 A1 | 2/2010 | Kitazawa |
| 2010/0034635 A1 | 2/2010 | Erickson et al. |
| 2010/0042367 A1 | 2/2010 | Brown |
| 2010/0050591 A1 | 3/2010 | Nemet et al. |
| 2010/0070098 A1 | 3/2010 | Sterzing et al. |
| 2010/0077970 A1 | 4/2010 | Kumar et al. |
| 2010/0082267 A1 | 4/2010 | Schimert et al. |
| 2010/0106462 A1 | 4/2010 | Liu |
| 2010/0117859 A1 | 5/2010 | Mitchell et al. |
| 2010/0122535 A1 | 5/2010 | Finkbeiner |
| 2010/0161154 A1 | 6/2010 | Nomura |
| 2010/0162678 A1 | 7/2010 | Annigeri |
| 2010/0162724 A1 | 7/2010 | Myers et al. |
| 2010/0170219 A1 | 7/2010 | Venkataraman et al. |
| 2010/0170244 A1 | 7/2010 | Brooks et al. |
| 2010/0170261 A1 | 7/2010 | Stieger et al. |
| 2010/0172017 A1 | 7/2010 | Kim et al. |
| 2010/0198419 A1 | 8/2010 | Sonoda et al. |
| 2010/0199680 A1 | 8/2010 | Nomura et al. |
| 2010/0204931 A1 | 8/2010 | Ling et al. |
| 2010/0205976 A1 | 8/2010 | Nag et al. |
| 2010/0215480 A1 | 8/2010 | Leach et al. |
| 2010/0220182 A1 | 9/2010 | Krull et al. |
| 2010/0223933 A1 | 9/2010 | Umeh et al. |
| 2010/0229524 A1 | 9/2010 | Bhatnagar et al. |
| 2010/0241331 A1 | 9/2010 | Duke et al. |
| 2010/0242436 A1 | 9/2010 | Tangirala et al. |
| 2010/0242492 A1 | 9/2010 | Sloat et al. |
| 2010/0262263 A1 | 10/2010 | Karaffa et al. |
| 2010/0262265 A1 | 10/2010 | Karaffa |
| 2010/0262352 A1 | 10/2010 | Kuwahara et al. |
| 2010/0262401 A1 | 10/2010 | Pfeifer |
| 2010/0269515 A1 | 10/2010 | Kishi et al. |
| 2010/0275609 A1 | 11/2010 | Snider |

(56) References Cited

U.S. PATENT DOCUMENTS

| | | |
|---|---|---|
| 2010/0278639 A1 | 11/2010 | Hood et al. |
| 2010/0280730 A1 | 11/2010 | Page et al. |
| 2010/0286889 A1 | 11/2010 | Childers |
| 2010/0286890 A1 | 11/2010 | Chandler |
| 2010/0287943 A1 | 11/2010 | McMahan et al. |
| 2010/0287947 A1 | 11/2010 | Rogers et al. |
| 2010/0300108 A1 | 12/2010 | Demougeot et al. |
| 2010/0301615 A1 | 12/2010 | Yamashita et al. |
| 2010/0307157 A1 | 12/2010 | Bilton et al. |
| 2010/0307158 A1 | 12/2010 | Bilton et al. |
| 2010/0313572 A1 | 12/2010 | McManus et al. |
| 2010/0326080 A1 | 12/2010 | Rogers et al. |
| 2011/0004356 A1 | 1/2011 | Garcia |
| 2011/0004390 A1 | 1/2011 | Nomura et al. |
| 2011/0048022 A1 | 3/2011 | Singh et al. |
| 2011/0052370 A1 | 3/2011 | Karpman et al. |
| 2011/0054704 A1 | 3/2011 | Karpman et al. |
| 2011/0056181 A1 | 3/2011 | Dinu |
| 2011/0077783 A1 | 3/2011 | Karpman et al. |
| 2011/0079015 A1 | 4/2011 | Geis et al. |
| 2011/0079020 A1 | 4/2011 | Durocher et al. |
| 2011/0137536 A1 | 6/2011 | Tonno et al. |
| 2011/0138766 A1 | 6/2011 | ELKady et al. |
| 2011/0138813 A1 | 6/2011 | Sandvik et al. |
| 2011/0146232 A1 | 6/2011 | Westervelt et al. |
| 2011/0153295 A1 | 6/2011 | Yerramalla et al. |
| 2011/0154826 A1 | 6/2011 | Iwasaki et al. |
| 2011/0154828 A1 | 6/2011 | Iwasaki et al. |
| 2011/0156391 A1 | 6/2011 | Kirchner et al. |
| 2011/0160979 A1 | 6/2011 | Muller |
| 2011/0172893 A1 | 7/2011 | Nomura et al. |
| 2011/0179802 A1 | 7/2011 | Snider et al. |
| 2011/0191004 A1 | 8/2011 | Nomura et al. |
| 2011/0196593 A1 | 8/2011 | Jiang et al. |
| 2011/0197594 A1 | 8/2011 | Khosla et al. |
| 2011/0214644 A1 | 9/2011 | Barta et al. |
| 2011/0215775 A1 | 9/2011 | Engelhardt et al. |
| 2011/0224959 A1 | 9/2011 | Zhang et al. |
| 2011/0225976 A1 | 9/2011 | Ziminsky et al. |
| 2011/0239621 A1 | 10/2011 | Meneely et al. |
| 2011/0247314 A1 | 10/2011 | Chila et al. |
| 2011/0247406 A1 | 10/2011 | Grosse-Laxzen et al. |
| 2011/0262334 A1 | 10/2011 | Kraemer et al. |
| 2011/0265487 A1 | 11/2011 | Gauthier et al. |
| 2011/0270502 A1 | 11/2011 | Demougeot et al. |
| 2011/0270503 A1 | 11/2011 | Stuttaford et al. |
| 2011/0277482 A1 | 11/2011 | Mosley et al. |
| 2011/0277539 A1 | 11/2011 | Meerbeck et al. |
| 2011/0289932 A1 | 12/2011 | Thompson |
| 2011/0289934 A1 | 12/2011 | Desabhatla |
| 2012/0221193 A1 | 8/2012 | Delaye |
| 2012/0275899 A1 | 11/2012 | Chandler |
| 2013/0113913 A1 | 5/2013 | Scheid |
| 2013/0139520 A1 | 6/2013 | Masse |
| 2013/0173074 A1 | 7/2013 | Chandler |
| 2013/0274898 A1 | 10/2013 | Thatikonda |

FOREIGN PATENT DOCUMENTS

| | | |
|---|---|---|
| CN | 101438367 | 5/2009 |
| EP | 0 306 064 | 3/1989 |
| EP | 1067338 A2 | 1/2001 |
| EP | 1199519 | 4/2002 |
| EP | 1348908 | 10/2003 |
| EP | 1788309 | 5/2007 |
| EP | 1808589 | 7/2007 |
| EP | 1909032 A2 | 4/2008 |
| EP | 2 014 898 | 1/2009 |
| EP | 2204561 A2 | 7/2010 |
| EP | 2249007 | 11/2010 |
| EP | 2333280 A2 | 6/2011 |
| GB | 2 272 783 | 5/1994 |
| JP | 61036809 | 2/1986 |
| JP | 08-042361 | 2/1996 |
| JP | 08-210635 A2 | 8/1996 |
| JP | 2006-144796 | 6/2006 |
| JP | 2007-138949 | 6/2007 |
| JP | 2009-296994 | 12/2009 |
| JP | 2010-103781 | 5/2010 |
| JP | 2010-159954 | 7/2010 |
| RU | 2 162 953 | 2/2001 |
| RU | 2 252 328 | 5/2005 |
| RU | 2 280 775 | 7/2006 |
| RU | 2 287 074 | 11/2006 |
| RU | 2 322 601 | 4/2008 |
| TW | 385352 | 3/2000 |
| TW | 200928079 | 7/2009 |
| WO | 2013/151782 A1 | 10/2013 |

OTHER PUBLICATIONS

Doris Saez, Freddy Milla and Luis S. Vargas, "Fuzzy Predictive Supervisory Control Based on Genetic Algorithms for Gas Turbines of Combined Cycle Power Plants," IEEE Transactions of Energy Conversion, vol. 22, No. 3, Sep. 2007.

John Xia and Rick Antos, "SGT6-5000F (W501F) 3 Million Hours Fleet Operational Experience," Power-Gen International 2006—Orlando, FL, Nov. 2006.

Angello, L., "Tuning Approaches for DLN Combustor Performance and Reliability" Technical Update, Electric Power Research Institute (EPRI), Mar. 2005.

Jesse Sewell, Pete Sobieski, and Craig Beers, "Application of Continuous Combustion Dynamics Monitoring on Large Industrial Gas Turbines," ASME Conf. Proc. 2004, 807 (2004).

Bland, R., Ryan, W., Abou-Jaoude, K., Bandaru, R., Harris, A., Rising, B., "Siemens W501F Gas Turbine: Ultra Low NOx Combustion System Development," Siemens Westinghouse, 2004.

Sébastien Candel, "Combustion dynamics and control: Progress and challenges," Proceedings of the Combustion Institute, vol. 29, Issue 1, 2002, pp. 1-28.

Yoshi Usune, Masao Terazaki, Yasuoki Tomita, Jun-Hee Lee, "Technical Approach to Higher Availability of Gas Turbine Combined Cycle".

Andersen, Helmer, "Early Detection of Combustor Pulsations and Optimized Operation Through On-Line Monitoring Systems," International Gas Turbine and Aeroengine Congress and Exhibition, May 2000.

Corbett, N.C., "Remote Monitoring and Control of Advanced Gas Turbines," Computing & Control Engineering Journal, Apr. 2001.

Jeffrey D. Willis and A. John Moran, "Industrial RB211 DLE Gas Turbine Combustion Update," Proceedings of ASME Turboexpo, 2000.

Thomas Scarinci and John L. Halpin, "Industrial Trent Combustor—Combustion Noise Characteristics," International Gas Turbine & Aeroengine Congress & Exhibition, 1999.

Frank J. Brooks, "GE Gas Turbine Performance Characteristics," GE Power Systems, GER-3567H, 10/00.

Notice of Allowance and Fees due dated Dec. 24, 2015, in related U.S. Appl. No. 13/855,220.

Office Action dated Nov. 19, 2015 in corresponding Chinese Application No. 201310136070.5, along with its English Translation.

Office Action dated Jan. 15, 2015 from related U.S. Appl. No. 13/855,220.

Office Action along with Search Report and its English Translation dated May 30, 2015, received in related Taiwanese Application No. 102106081.

Office Action along with Search Report and its English Translation dated May 28, 2015, received in related Taiwanese Application No. 102106078.

Examiner's Requisition from corresponding Canadian Application No. 2,817,609.

Communication dated Jun. 20, 2013 issued in corresponding European Application No. 10159823.3 with attached Search Report.

Int'l Search Report dated Jun. 20, 2013 issued in corresponding Int'l Application No. PCT/US2013/026291.

Int'l Search Report dated Jun. 20, 2013 issued in corresponding Int'l Application No. PCT/US2013/026295.

(56) References Cited

OTHER PUBLICATIONS

Office Action w/ English Translation dated Jun. 9, 2014 issued in Corresponding Mexican Application No. MX/a/2010/004869.
Search Report dated Apr. 20, 2014 issued in Corresponding Gulf Cooperation Council Application No. 2010/15815.
Office Action dated Feb. 27, 2013 issued in corresponding Chinese Application No. 201010177967.9 with attached Search Report.
Examination Report dated Dec. 31, 2015 in corresponding Indian Application No. 1284/MUM/2010.
Examination Report from counterpart Canadian Application No. 2,901,077 dated Nov. 14, 2018.
Examination Report from corresponding GCC Application No. GC 2013-24867 filed Jul. 3, 2013; dated Sep. 19, 2017.
Examination Report dated Oct. 31, 2016, directed to corresponding Gulf Cooperation Council Application No. GC 2013-23625; 6 pages.
Examination Report dated Oct. 31, 2016, directed to corresponding Gulf Cooperation Council Application No. GC 2013-23626; 6 pages.
Non-Final Office Action in corresponding U.S. Appl. No. 16/691,057 dated Oct. 6, 2020.

\* cited by examiner

AUTOMATED TUNING OF GAS TURBINE COMBUSTION SYSTEMS

TECHNICAL FIELD

The present disclosure relates to an automated system to sense the operating condition of a turbine combustion system and to make adjustments to achieve desired operation of the turbine combustion system.

BACKGROUND

Lean premixed combustion systems have been deployed on land based gas turbine engines to reduce emissions, such as NOx and CO. These systems have been successful and, in some cases, produce emission levels that are at the lower limits of measurement capabilities, approximately 1 to 3 parts per million (ppm) of NOx and CO. Although these systems are a great benefit from a standpoint of emission production, the operational envelope of the systems is substantially reduced when compared to more conventional combustion systems. As a consequence, the control of fuel conditions, distribution and injection into the combustion zones has become a critical operating parameter and requires frequent adjustment, when ambient atmospheric conditions, such as temperature, humidity and pressure, change. The re-adjustment of the combustion fuel conditions, distribution and injection is termed tuning.

Controlled operation of a combustion system generally employs a manual setting of the operational control settings of a combustor to yield an average operational condition. These settings may be input through a controller, which as used herein shall mean any device used to control the operation of a system. Examples include a Distributed Control System (DCS), a gas turbine controller, a programmable logical controller (PLC), a stand-alone computer with communication to another controller and/or directly to a system.

These settings are satisfactory at the time of the setup, but conditions may change when tuning issues arise and cause an unacceptable operation in a matter of hours or days. Tuning issues are any situation whereby any operational parameters of a system are in excess of acceptable limits. Examples include emissions excursion outside of allowable limits, combustor dynamics excursion outside of allowable limits, or any other tuning event requiring adjustment of a turbine's operational control elements. Other approaches use a formula to predict emissions based on a gas turbine's operating settings and select a set point for fuel distribution and/or overall machine fuel/air ratio, without modifying other control elements, such as fuel gas temperature. These approaches do not allow for timely variation, do not take advantage of actual dynamics and emission data or do not modify fuel distribution, fuel temperature and/or other turbine operating parameters.

Another variable that impacts the lean premixed combustion system is fuel composition. Sufficient variation in fuel composition will cause a change in the heat release of the lean premixed combustion system. Such change may lead to emissions excursions, unstable combustion processes, or even blow out of the combustion system.

Mis-operation of the combustion system manifests itself in augmented pressure pulsations or an increase in combustion dynamics (hereinafter, combustion dynamics may be indicated by the symbol "HP"). Pulsations can have sufficient force to destroy the combustion system and dramatically reduce the life of combustion hardware. Additionally, improper tuning of the combustion system can lead to emission excursions and violate emission permits. Therefore, a means to maintain the stability of the lean premixed combustion systems, on a regular or periodic basis, within the proper operating envelope, is of great value and interest to the industry. Additionally, a system that operates by utilizing near real-time data, taken from the turbine sensors, would have significant value to coordinate modulation of operational control elements such as fuel distribution, fuel gas inlet temperature and/or overall machine fuel/air ratio.

While real-time tuning of a combustion system can provide tremendous operational flexibility and protection for turbine hardware, a combustion system may concurrently experience a number of different operational issues. For example, most turbine operators of lean premixed combustion systems are concerned with exhaust emissions (NOx and CO) as well as combustor dynamics. It is not uncommon for both high NOx emissions and high combustor dynamics to coexist on a turbine. Additionally, tuning in response to one concern can make other constraints worse, for example tuning for low NOx can make combustor dynamics worse, tuning for high CO can make NOx worse, etc. It would be beneficial to provide a system whereby an algorithm is used to compare the current status of all tuning concerns, rank each concern in order of importance, determine the operational concern of most interest, and subsequently commence automated tuning to remediate this dominant operational concern.

SUMMARY OF THE DISCLOSURE

The present disclosure provides a tuning system for tuning the operation of a gas turbine. The system comprises operational turbine controls for controlling operational control elements of the turbine, including at least one of turbine fuel distribution or the fuel temperature. The system also has a tuning controller communicating with the turbine controls. The tuning controller is configured to tune the operation of the turbine in accordance with the following steps: receiving operational data about the turbine, providing a hierarchy of tuning issues, determining whether sensed operational data is within predetermined operational limits and producing one or more indicators. If the operational data is not within predetermined operational limits, the tuning controller will rank the one or more indicators to determine the dominant tuning concern, and tune the operation of the turbine based on the dominant tuning concern.

The present disclosure also provides a method of tuning the operation of a gas turbine. The turbine has turbine controls for controlling various operational elements of the turbine. The method includes the steps of receiving operational data about the turbine, providing a hierarchy of tuning issues and determining whether sensed operational data is within predetermined operational limits and producing one or more indicators. If said operational data is not within predetermined operational limits, the tuning controller ranks the one or more indicators to determine dominant tuning concern; and tunes the operation of the turbine based on dominant tuning concern.

The present disclosure further provides a computer readable medium having embodied therein a computer program for tuning the operation of a combustion turbine. The computer readable medium comprises code segments for receiving operational data for the turbine, providing a hierarchy of tuning issues, determining whether sensed operational data is within predetermined operational limits and producing one or more indicators if said operational data is not within predetermined operational limits. The computer readable medium also comprises code for ranking the one or more indicators to determine the dominant tuning concern and tuning the operation of the turbine based on the dominant tuning concern.

The present disclosure provides a controller and method for tuning the operation of a gas turbine of the type having sensors for measuring operational parameters of the turbine and controls for controlling various operational control elements of the turbine. The operational parameters of the turbine which are received by the controller may include one or more of the following: combustor dynamics, turbine exhaust temperature and turbine exhaust emissions. The operational control elements include one of more of the following: fuel distribution, fuel temperature and fuel air ratio. A communication link may be provided between the tuning controller, gas turbine controller and a main power plant control system. This link permits communication with the turbine's sensors and the operational controls from devices outside of the turbine system.

The controller operates by receiving data from the sensors. Operational priorities for the turbine may be set within the controller and are typically selected from optimum NOx emissions, optimum power output and/or optimum combustor dynamics. The data received from the turbine sensors is compared to stored operational standards within the controller. The selected operational standards are preferably based on the set operational priorities. A determination is made as to whether the turbine operation conforms to the operational standards. In addition, upon the data being determined to be out of conformance, a further determination is made of the dominant tuning concern. This further determination is preferably based on the preset operational priorities. Once the logical determinations are made, the tuning controller communicates with the operational control means to perform a selected adjustment of an operational control element of the turbine. The selected adjustment is preferably based on the dominant tuning concern and has a preset fixed incremental value and defined value range. Each incremental change is preferably input over a set period of time, which is sufficient for the turbine to gain operational stability, once an adjustment is made. Once the time period passes, operational data is again received from the turbine sensor means to determine if an additional incremental change to an operational control element is desired. Upon completing the adjustments within a defined range, a further operational control element is adjusted, again preferably based on the dominant tuning concern, and a further fixed incremental adjustment is made. The tuning process continues by the controller receiving operational data to determine if the operation is conforming to the operational standards or whether an additional adjustment is required. The operational control elements being adjusted by the tuning controller may include one or more of the following: the combustor fuel distribution split within the nozzles of the combustor, the fuel gas inlet temperature, and/or the fuel/air ratio within the turbine.

In a further aspect of the disclosure, the system performs a method for determination of the dominant gas turbine combustion system tuning scenario (dominant tuning concern) through the use of Boolean hierarchical logic and multiple levels of control settings.

In another aspect of the disclosure, the method performed relates to automated control of the gas turbine inlet fuel temperature through automated modification of the fuel gas temperature control set point within a Distributed Control System (DCS) or similar control system.

In a still further aspect of the disclosure, a method for automated control of a gas turbine inlet fuel temperature is defined by automated modification of the fuel gas temperature control set point within the fuel gas temperature controller.

In another aspect of the disclosure a method for communicating turbine control signals to a gas turbine controller is accomplished through the use of an existing gas turbine communication link with an external control device, such as, for example a MODBUS Serial or Ethernet communication protocol port existing on the turbine controller for communication with the Distributed Control System (DCS).

In a still further aspect of the disclosure a method for modification of a gas turbine combustion system is defined by a series of auto tuning settings via a user interface display, which utilizes Boolean-logic toggle switches to select user-desired optimization criteria. The method is preferably defined by optimization criteria based on Optimum Combustion Dynamics, Optimum NOx Emissions, Optimum Power, Optimum Heat Rate, Optimum CO Emissions, Optimum Heat Recovery Steam Generator (HRSG) Life, Optimum Gas Turbine Fuel Blend Ratio or Optimal Gas Turbine Turndown Capability whereby toggling of this switch changes the magnitude of the combustor dynamics control setting(s).

In a still further aspect of the disclosure a method for modification of a gas turbine combustion system is defined by real-time adjustment of a series of auto tuning settings via a tuning parameter adjustment interface, whereby the specific turbine control settings can be modified in real-time by the user/operator through modulation of a series of control devices, whereby activation of these control devices is allowed through triggering of the following Boolean-logic toggle switches: Optimum Combustion Dynamics, Optimum NOx Emissions, Optimum Power, Optimum Heat Rate, Optimum CO Emissions, Optimum Heat Recovery Steam Generator (HRSG) Life, Optimum Gas Turbine Fuel Blend Ratio or Optimal Gas Turbine Turndown Capability.

BRIEF DESCRIPTION OF DRAWINGS

For the purpose of illustrating the disclosure, the drawings show forms that are presently preferred. It should be understood that the disclosure is not limited to the precise arrangements and instrumentalities shown in the drawings of the present disclosure.

DETAILED DESCRIPTION

The present disclosure generally relates to systems and methods for tuning the operation of combustion turbines. In the depicted embodiments, the systems and methods relate to automatic tuning of combustion turbines, such as those used for power generation. Persons of ordinary skill in the art will appreciate that the teachings herein can be readily adapted to other types of combustion turbines. Accordingly, the terms used herein are not intended to be limiting of the embodiments of the present invention. Instead, it will be understood that the embodiments of the present disclosure relate generally to the field of combustion turbines, and in particular for systems, methods and computer readable media for tuning of combustion turbines.

Figure 1:
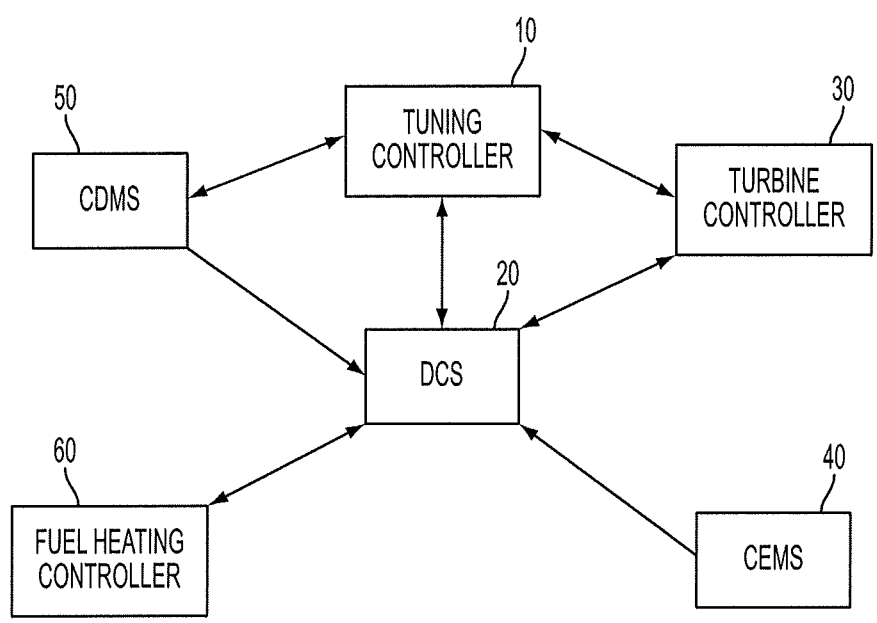
FIG. 1 shows an exemplary embodiment of a schematic representation of an operational plant communication system encompassing the gas turbine engine system and incorporating a gas turbine tuning controller.

FIG. 1 shows a communication diagram for a gas turbine engine (not shown), within which a tuning controller 10 of the present disclosure operates. As shown, a communication link, such as a Distributed Control System (DCS) is identified by the numeral 20, and provides a link to the various elements of the system. However, the operational elements of the turbine may be linked directly to each other, without the need for a DCS. As shown, turbine controller 30 communicates directly with the gas turbine (not shown) and with other elements of the system, such as the tuning controller 10, either directly or through the DCS 20. In the present disclosure, information relevant to turbine operation is directed through the to the tuning controller 10. This relevant information is also referred to as the turbine's operational parameters, which are parameters that are measured, by way of various types and number of sensors, to indicate the operational status of various aspects of the gas turbine. These parameters can be fed as inputs into the autotuning controller. Examples of operational parameters include combustor dynamics, turbine exhaust emissions, and turbine exhaust temperature (which is generally influenced by the overall fuel/air ratio of the turbine).

Figure 2:
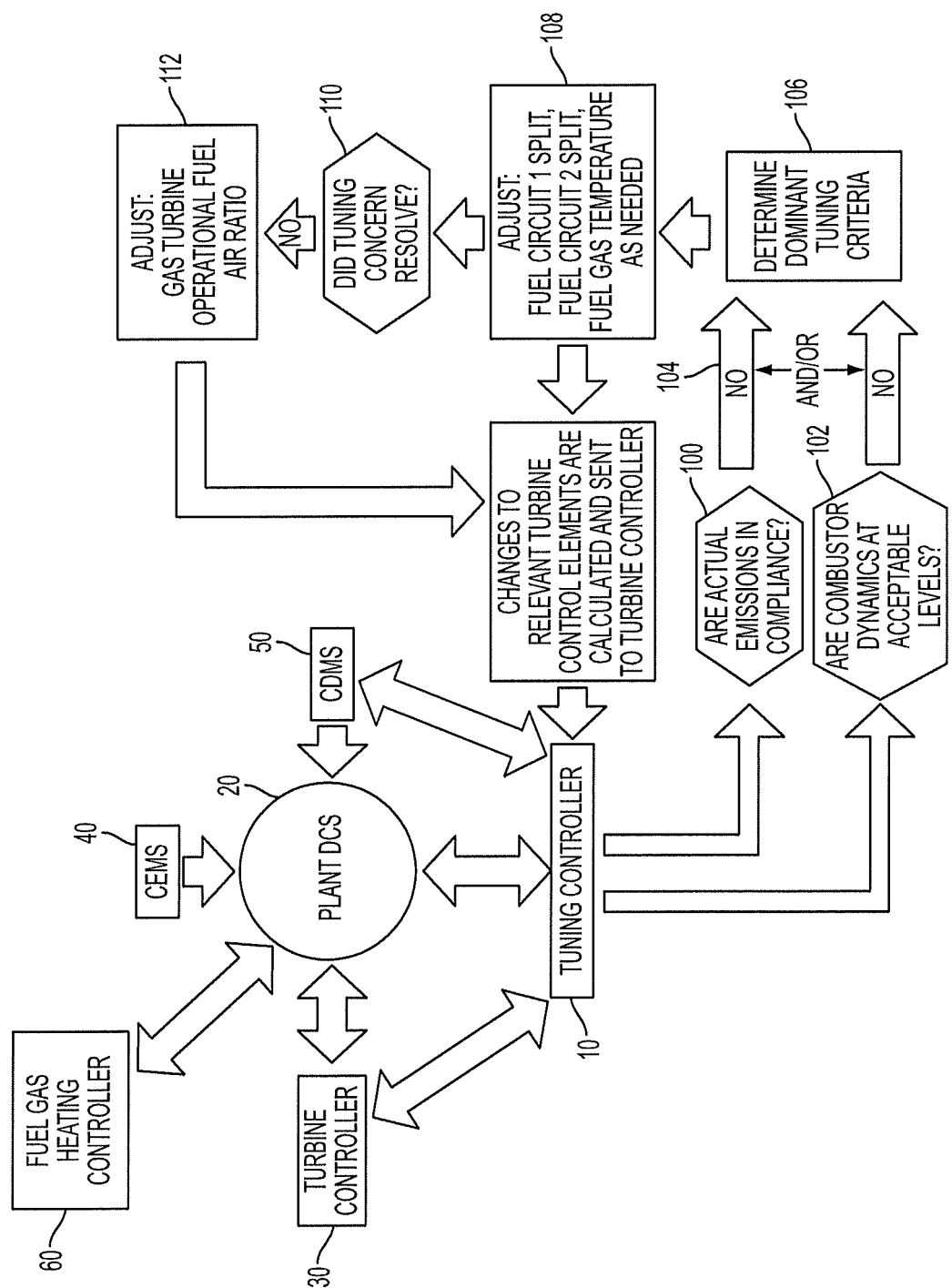
FIG. 2 shows an exemplary embodiment of a functional flow chart for the operation of a tuning controller according to the present disclosure.

Referring now to FIGS. 1 and 2, the tuning controller 10 is contemplated to be a stand-alone computer, such as a PC, operating to run as a programmable logical controller (PLC), using a form of computer readable media. The tuning controller 10 is preferably a separate computer from the turbine controller 30 that is in constant communication from with the turbine controller 30. Signals from the tuning controller 10 may also be transferred to the turbine controller 30 or other controls within the system by the use of an external control device, such as a MODBUS Serial or Ethernet communication protocol port existing on or added to the system.

The relevant operational parameters are received from sensor means associated with the turbine. For example, the turbine exhaust emission reading is taken from stack emissions by a continuous emissions monitoring system (CEMS) 40, and sent to the tuning controller 10 and/or the turbine controller 30. Combustion dynamics are sensed using a dynamic pressure sensing probe located within the combustion region of the turbine combustor. As shown, a continuous dynamics monitoring system (CDMS) 50 is provided and communicates with the tuning controller 10 and turbine controller 30. The CDMS 50 preferably uses either direct mounted or wave guide connected pressure or light sensing probes to measure the combustion dynamics. Another relevant operational parameter is the fuel gas temperature, which is sensed at the fuel heating controller 60. The fuel temperature information is directed to the tuning controller 10 and turbine controller 30 from the fuel heating controller 60. Since part of the tuning operation may include adjustment of the fuel temperature, there may be a two-way communication between the tuning controller 10 and/or turbine controller 30 and the fuel heating unit 60.

Relevant operational data from the turbine is collected at least several times per minute. This data collection allows for near real-time system tuning. Most relevant turbine operational data is collected by the tuning controller 10 in near real-time. However, the turbine exhaust emissions is typically received from the CEMS 40 by the tuning controller 10 with a lag time of up to 2 to 8 minutes from current operating conditions. This time lag necessitates the need for the tuning controller 10 to receive and buffer relevant information, for a similar time lag, before making operational tuning adjustments. The tuning controller 10 tuning adjustment time lag assures that all of the operational (including exhaust emissions) data is representative of a stable turbine operation before and after any adjustments are made. Once the data is deemed stable, the tuning controller 10 determines whether there is a need for adjustment of operational control elements to bring the tuning parameters into acceptable ranges. If no adjustment is necessary, the tuning controller 10 maintains the current tuning and waits to receive the next data set. If changes are desired, tuning commences. As used herein, control elements are control inputs that can be manipulated by the tuning controller 10 to produce a change in the operational parameters of a gas turbine. These elements can either reside within the turbine controller 10, within the plant distributed control system (DCS), or within an external controller that controls the properties of inputs into the gas turbine (such as fuel gas temperature). Examples of operational control elements include combustor fuel splits, turbine fuel/air ratio, and fuel gas inlet temperature.

All determinations of the need for turbine tuning are performed within the tuning controller 10. The tuning operation is started based on an indicator, such as an "alarm" created by receipt of operational parameter data outside of preset operational criteria. In order for the tuning operation to be initiated, the alarm—and thus the data anomaly—must continue for a predetermined period of time.

One example of a tuning adjustment is the variation of the fuel nozzle pressure ratio to adjust combustion dynamics. With the requirement of higher firing temperatures to achieve greater flame temperatures and efficiency, turbine combustors must release more energy in a given combustor volume. Better exhaust emissions are often achieved by increasing the mixing rate of fuel and air upstream of the combustion reaction zone. The increased mixing rate is often achieved by increasing the pressure drop at the fuel nozzle discharge. As the mixing rate increases in combustors, the turbulence generated by combustion often leads to noise within the combustor and may lead to the generation of acoustic waves. Typically, acoustic waves are caused when the sound waves of the combustion flames are coupled with the acoustic characteristics of the combustor volume or the fuel system itself.

Acoustic waves may affect the internal pressure in the chamber. Where combustor pressure near a fuel nozzle rises, the rate of fuel flowing through the nozzle and the accompanying pressure drop decreases. Alternatively, a decrease in pressure near the nozzle will cause an increase in fuel flow. In cases where a low fuel nozzle pressure drop allows fuel flow oscillation, a combustor may experience amplified pressure oscillations. To combat the pressure oscillations within the combustor, combustion dynamics are monitored and the fuel air ratio and fuel nozzle pressure ratio may be modified to reduce or eliminate unwanted variations in combustor pressure, thereby curing an alarm situation or bringing the combustion system back to an acceptable level of combustion dynamics.

Figure 3:
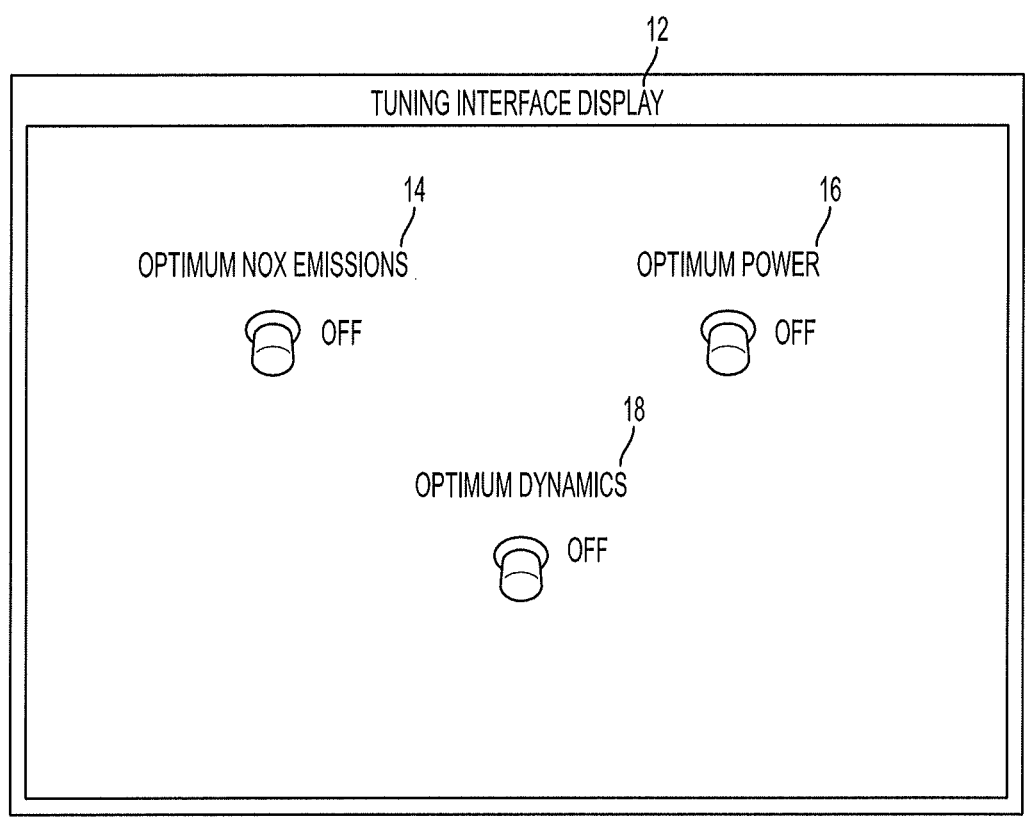
FIG. 3 shows an exemplary embodiment of a user interface display for selecting the optimization mode within the present disclosure.

As shown in FIG. 2, the data received from the CDMS 50, CEMS 40, fuel gas temperature controller 60 and other relevant turbine operating parameters from the turbine controller 30 may be directed through the DCS 20 to the tuning controller 10. Alternatively, although not shown, one or more of these elements may communicate directly with each other, without the need for a DCS 20. The input values are then compared to standard or target operational data for the turbine that are stored in the tuning controller as operational standards. The stored operational standards are based, at least in part, on the operational priority settings for the turbine in the form of tuning alarm levels, as will be described in more detail below. The priority settings are defined by user selected inputs on the main user interface 12 of the tuning controller 10, as shown in FIG. 3. Based on the priority settings, a series of adjustments are made to the operation of the turbine by the turbine controller 10. The adjustments are directed to the control means, including the fuel heating unit 60 (FIG. 1) and various other operational control elements of the turbine controller 30.

The interface display 12 depicted in FIG. 3 is the main user interface display that end users will operate to determine tuning alarm levels. The interface 12 is comprised of switches (each having an On/Off indication). These switches allow the user to specify the desired tuning priorities for the operation of the turbine. In the embodiment shown, the switched operational priorities include optimum NOx emissions 14, optimum power 16 and optimum combustor dynamics 18. Each of these switches is set by the user to adjust the preferred operation of the turbine. Switching the switches from "Off" to "On" operates to change the alarm limits for each parameter. Additionally, switching some or all of the Operational Priorities 14, 16, 18 to "On" affords the user further turbine optimization though real-time adjustments of pertinent control settings via the Tuning Parameter Adjustment Interface 262 of FIG. 19. Within the tuning controller 10 are functions that modify operations within the turbine, based on priorities set by the switches. The priorities may also be governed by hard coded logic in addition to user selected priorities and manual settings, as discussed in further detail below. For example, in the embodiment described here, if both the optimum NOx emissions switch 14 and the optimum power switch 16 are set to "On", the controller 10 will run in the Optimum NOx mode, not Optimum power. Thus, to run in Optimum power mode, the Optimum NOx emissions switch 14 must be "Off". In the embodiment shown, Optimum power 16 may only be selected if Optimum NOx 14 is in the off position. Optimum dynamics 18 can be selected at any time. It is explicitly noted that other User-Interface Toggle Switches (not shown) may be used, including parameters such as Optimum Heat Rate, Optimum CO emissions, Optimum Heat Recovery Steam Generator (HRSG) Life, Optimum Gas Turbine Fuel Blend Ratio, Optimal Gas Turbine Turndown Capability, etc.

Figure 4:
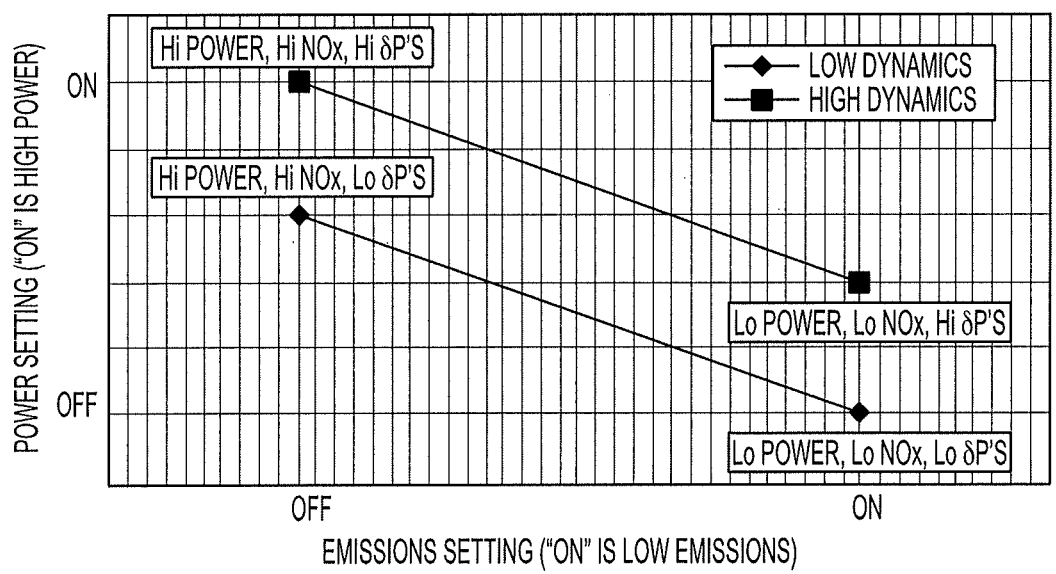
FIG. 4 shows an exemplary schematic of the inter-relationship of various optimization mode settings.

FIG. 4 shows a graphical representation of the interrelationship of the interface display switches. As shown, switching one parameter "On" will alter the alarm limits to a different level than their "Off" level. In the example shown in FIG. 4, the alarm limits are shown with both Optimum NOx and optimum power in the "On" position and in the "Off" position. These points on the graph are then modified by the selection of Optimum dynamics (represented throughout by the symbol 8) in either the "On" or "Off" position. The points shown on the graph of FIG. 4 represent an exemplary set of limits for dynamics, based on the user's selected operational priorities.

Returning to FIG. 2, there is shown a representation of the logical flow of the determinations and calculations made within the tuning controller 10. The tuning controller 10 receives the actual operating parameters of the turbine through the turbine controller 30, combustor dynamics through the CDMS 50, and the turbine exhaust emissions through the CEMS 40. This sensor data is directed to the tuning controller 10, either directly from the elements 40, 50 and 60 mentioned above, or through the DCS 20. The received sensor data is compared to stored operational standards to determine if the turbine operation is conforming to the desired settings. The operational standards are stored in the tuning controller 10 in the form of alarm levels, where normal operation of the turbine will return operational data for each parameter that is between the high and low alarm levels set for that parameter. The alarm levels for the operational standards are based on the preset operational priorities of the turbine, defined by the user switches 14, 16, 18 on the main user interface display 12 of the tuning controller 10, as discussed above with respect to FIG. 3.

Based on the preset operational priorities, a hierarchical Boolean logic approach that is coded into the tuning controller 10 determines the dominant tuning concern based on operational priorities. From this logical selection, the tuning controller 10 implements a fixed incremental adjustment value for changing an operational parameter of the turbine within a maximum range of adjustment (e.g., high and low values). The tuning changes are made in a consistent, predetermined direction over a pre-determined increment of time and are dependent on the dominant tuning concern at the time. It is contemplated that no formulaic or functional calculations are made to determine tuning adjustments; rather, the magnitude of the incremental adjustments, the direction of the adjustments, and the time span between adjustments for each control element are stored in the tuning controller 10 and selected based on the alarm(s) returned and user's operational priorities. This criteria is preferably stored in the tuning controller 10 as tuning control constraints and may be modified from time to time as desired by the user.

As shown in FIG. 2, the tuning controller 10 determines whether the emissions are in compliance 100 and whether the combustor dynamics are at acceptable levels 102 by comparing the operating parameters received from the CDMS 50 and CEMS 40 respectively, to the operational standards and alarm levels saved in the tuning controller 10 as discussed above. If both are in compliance with the set operational standards, no further action is taken and the tuning controller 10 waits for the next data set from the CEMS 40 or the CDMS 50, or for other operational data from the turbine controller 30. If the data received from the CEMS 40 or the CDMS 50 is non-conforming with the operational standards, i.e. above or below alarm levels, as is the case with step 104 of FIG. 2, the tuning operation moves to the next tuning step of first determining the dominant tuning concern 106. The logical adjustment of turbine operation is defined by the dominant tuning concern 106, which is based, at least in part, on the preset operational priorities set within the user interface 12, as will be discussed below with respect to FIG. 8.

Once the dominant tuning concern is determined, the tuning controller 10 will attempt to correct the operational parameter to ensure that the levels are within the operational standards stored in the tuning controller 10. In a preferred embodiment of the operation, to correct a tuning issue, the tuning controller 10 will first attempt to incrementally change the turbine combustor fuel splits 108. The fuel split determines the distribution of the fuel flow to the fuel nozzles in each combustor. If adjusting the fuel splits 108 does not resolve the tuning issue and place the operational parameters data back into conformance with the operational standards, a further adjustment to an additional operational control element is performed. Such additional operational control elements may be other fuel splits (in the case of a system with multiple fuel splits, often referred to as FS1, FS2, etc) or other features of operation, such as fuel air ratio or fuel temperature. In the example shown, the next incremental adjustment may be a change of the fuel gas temperature set point. In this adjustment step, the tuning controller 10 sends a modified fuel gas inlet temperature signal to the DCS 20, which is then directed to the fuel heating unit 60.

After the incremental steps are taken in step 108, a check at step 110, is made to see if modification of the combustor fuel splits and/or fuel gas inlet temperature resolved the tuning issue. If further tuning corrections are needed, the tuning controller 10 will alter the overall fuel/air ratio 112. This approach makes changes to the turbine thermal cycle utilizing fixed incremental changes over pre-determined amounts of time. The step of modifying the fuel/air ration 112 is intended to adjust the exhaust temperature (up or down) in accordance with predetermined, standard control curves for the turbine operation, which are maintained within the memory of the tuning controller 10.

In the present disclosure, the normal mode of communication provides tuning changes utilizing control signals intended for a given control element that are directed by the tuning controller to the turbine controller 30 through the DCS 20. However, the control signals can also be communicated directly to the turbine controller 30, without use of the DCS 20. These adjustments are implemented directly within the various controller means within the system or through the turbine controller 30. When the operational data is returned to within the desired operational standards, the tuning settings are held in place by the tuning controller 10 pending an alarm resulting from non-conforming data received from the sensor means 40, 50, 60.

The adjustments sent from the tuning controller 10 to the turbine controller 30 or the associated controller means are preferably fixed in magnitude. Thus, the adjustments are not recalculated with new data or optimized to a target. The adjustments are part of an "open loop." Once started, the adjustments move incrementally to the preset maximum or maximum within a specified range, unless an interim adjustment places the operation data into conformance with the operational standards or a new dominant tuning concern arises. Under most circumstances, when the full incremental range for one operational control element is completed, the tuning controller 10 moves on to the next operational control element, which is defined by the preset operational priorities and dominant tuning concern. The logic of the tuning controller 10 drives the adjustment of operational control elements on a step-by-step basis, where the incremental steps of adjustment for each control element are stored within the memory of the tuning controller 10.

The tuning controller 10 preferably addresses one operational control element at a time. For example, the dominant tuning concern 106 dictates the first adjustment to be made. In the preferred example discussed above, the fuel distribution control element is first adjusted in step 108. As indicated in FIG. 2, during this step, the fuel split of fuel circuit 1 is addressed, followed by the split for fuel circuit 2.

It should be noted that the application of fuel circuits 1 and 2 is general in nature and can be applied to the specific hardware configuration within any particular combustion system. Therefore, this tuning approach is applicable to any combustion system, regardless if it has only one fuel split, two fuel splits, or more than two fuel splits. If the combustion system has only one useful fuel split, then this second tuning step or adjusting fuel circuit 2 may be left within the tuning algorithm; but, abandoned in-place. If the combustion system has more than 2 fuel splits, then the 2 most effective fuel split "knobs" or control elements are utilized, or there are additional adjustments to the remaining fuel splits as dictated by the particular combustion system being tuned. Last, the user can turn off the tuning of the $2^{nd}$ fuel circuit, thereby allowing only one fuel circuit to be used in tuning.

The fuel gas inlet temperature adjustment generally follows the fuel split adjustments when needed. Within each step, there is an incremental adjustment, followed by a time lag to permit the adjusted turbine operation to stabilize. After the time lag, if the current operational data analyzed by the tuning controller 10 indicates that turbine operation still remains outside of the operational standards, the next incremental adjustment is made. This pattern repeats for each step. Under most circumstances, only when one adjustment step is completed does the tuning controller move onto the next operational control element.

The tuning controller 10 preferably controls combustion operation to maintain proper tuning in variable conditions of ambient temperature, humidity and pressure, all of which vary over time and have a significant effect on turbine operation. The tuning controller 10 may also maintain the tuning of the turbine during variation in fuel composition. Variation in fuel composition may cause a change in the heat release, which can lead to unacceptable emissions, unstable combustion, or even blow out. The tuning controller 10 preferably does not serve to adjust fuel composition to compensate; rather, it tunes the operational control elements (fuel gas distribution, fuel gas inlet temperature, and/or turbine fuel/air ratio) to address the effects on combustion output and discharge. However, an embodiment where the tuning controller 10 also serves to adjust fuel composition may be incorporated into the present system with additional control architecture.

In other tuning scenarios, an alternate order for the adjustments is contemplated. For example, if the dominant tuning concern is high NOx emissions, the fuel temperature adjustment may be skipped, going directly to the operational control curves to adjust fuel/air ratio. If, however, Class 1 dynamics is the dominant tuning concern, the incremental fuel temperature adjustment may be performed before going to the operational control curves. Alternatively, the step of making adjustments to control elements in accordance with the operational fuel air ratio control curves may be turned off completely, based on a user's priorities.

Figure 5:
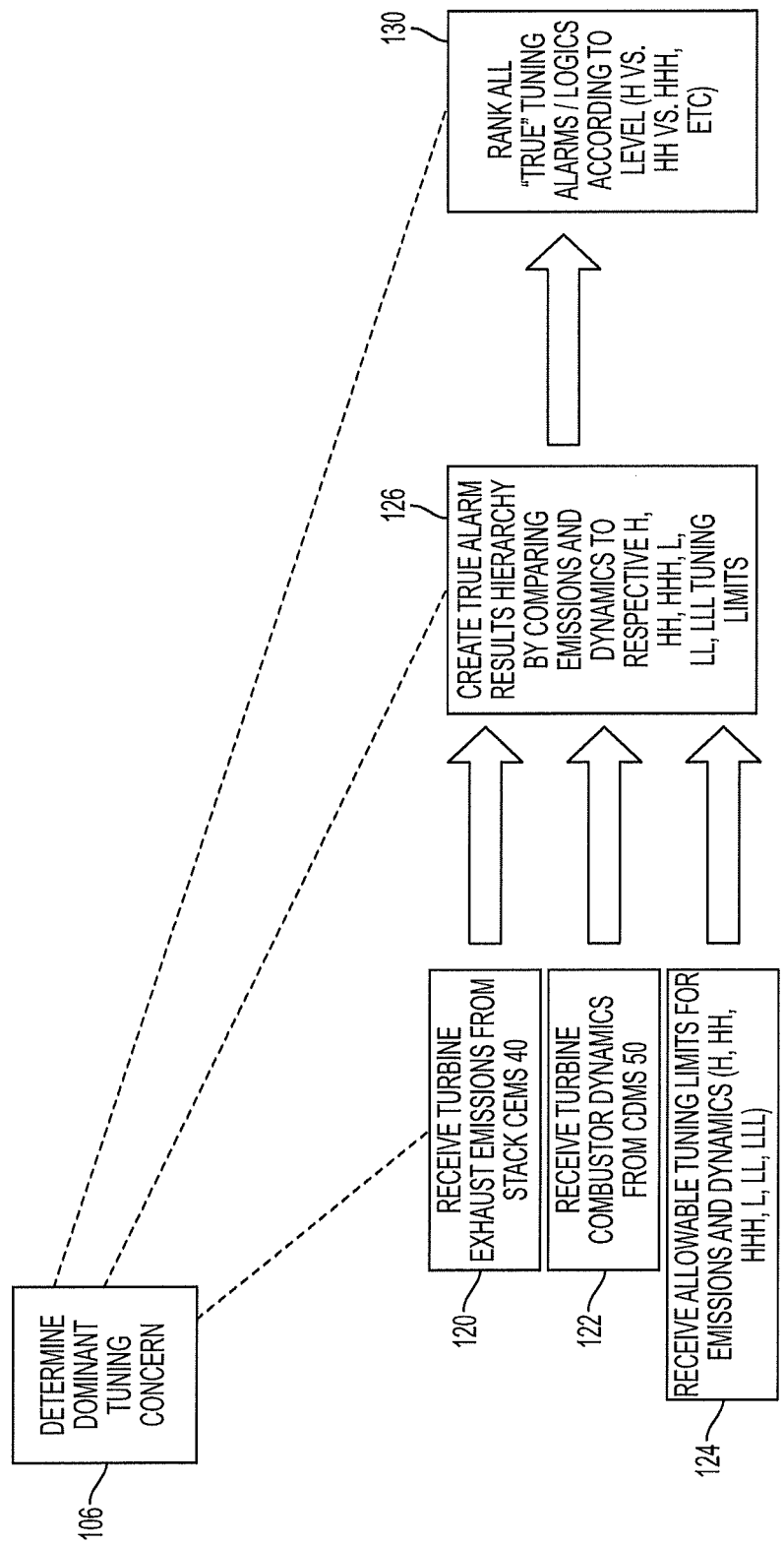
FIG. 5 shows an exemplary overview schematic of the process steps utilized to determine the alarm signals triggered according to the present disclosure.

FIG. 5 provides a schematic that details the framework for determining the dominant tuning concern 106, as included in FIG. 2. Future steps will be described below with respect to FIG. 8. First, relevant emissions parameters 120 and combustor dynamics 122 are received by the tuning controller 10 from the CEMS 40 and CDMS 50, as detailed above. The relevant emissions parameters 120 and combustor dynamics 122 are then compared to allowable tuning limits 124 that are also provided to the tuning controller 10. The allowable tuning limits are in the form of preset ranges that may be adjusted using the tuning interface 12 of FIG. 3 and Tuning Parameter Adjustment Interface 262 of FIG. 19, and determined according to the logic set forth below with respect to FIGS. 6 and 7. The output of this comparison is a series of "True" alarms 126 of various tuning concerns, where an alarm condition is indicated if the sensed operational data 120, 122 is above or below a given alarm range set forth in the tuning limits 124.

Figure 8:
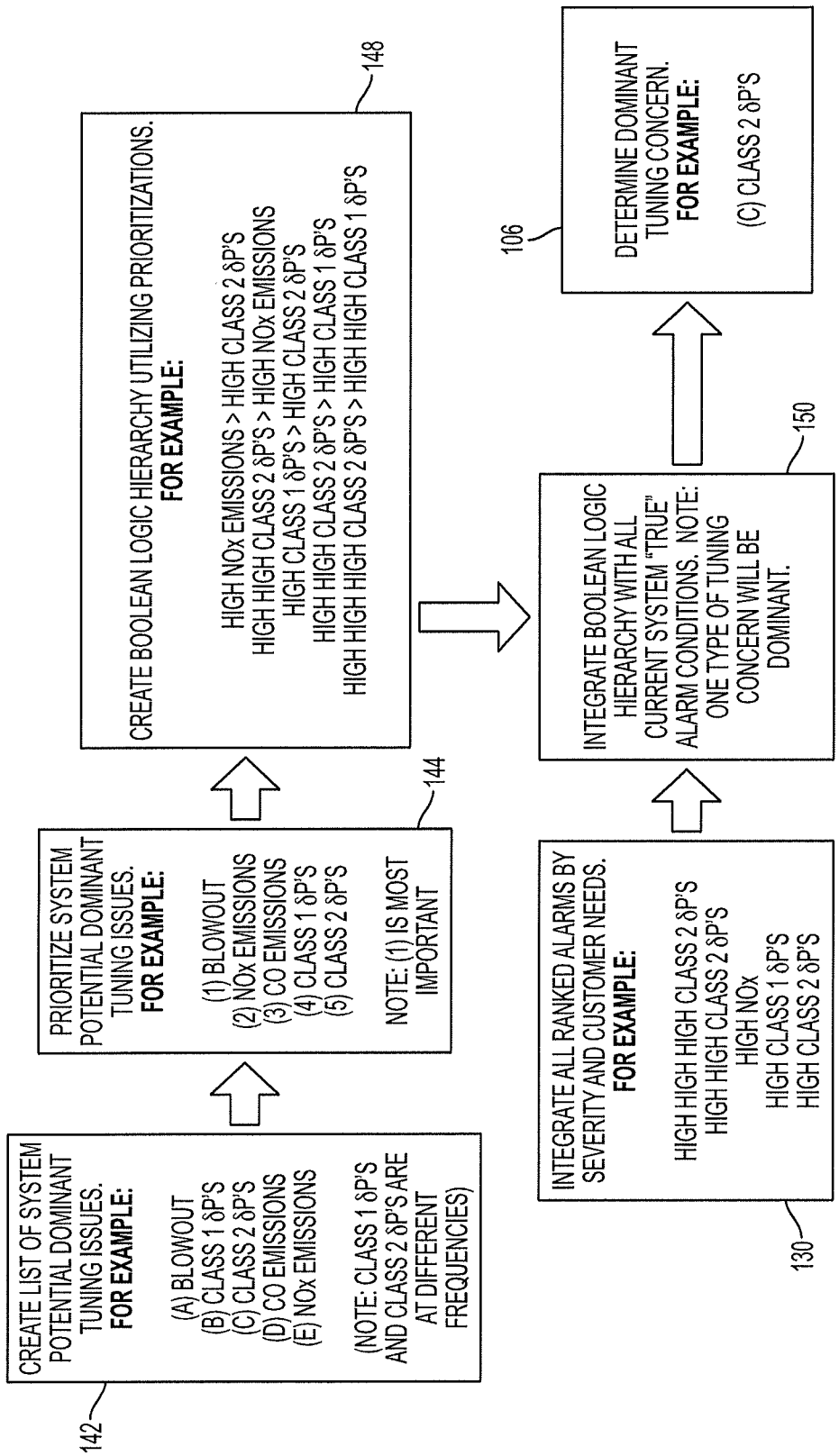
FIG. 8 provides a further detailed exemplary schematic of the steps the present disclosure utilizes to determine the dominant tuning concern.

Alarm conditions may have more than one level or tier. For example, there may be varying degrees of severity of an alarm, such as: high "H"; high-high "HH"; high-high-high "HHH" and low "L"; low-low "L"; low-low-low "LLL". The "True" logical alarms 126 are subsequently ranked according to their level of importance (e.g. high—high "HH" alarms are more important than high "H" alarms, etc) in step 130. If more than one tuning concern shares the same level, the tuning concerns will then be ranked according to the user preferences as set forth below with respect to FIG. 8. If only one "True" alarm emerges, this will be selected and used as the dominant tuning concern 106 to initiate the tuning process as set forth in FIG. 2. However, the results of the process of FIG. 5, namely the ranked "True" alarms 130, will be processed through user determined criteria, as shown in FIG. 8, before a dominant tuning concern 106 is confirmed.

Figure 6:
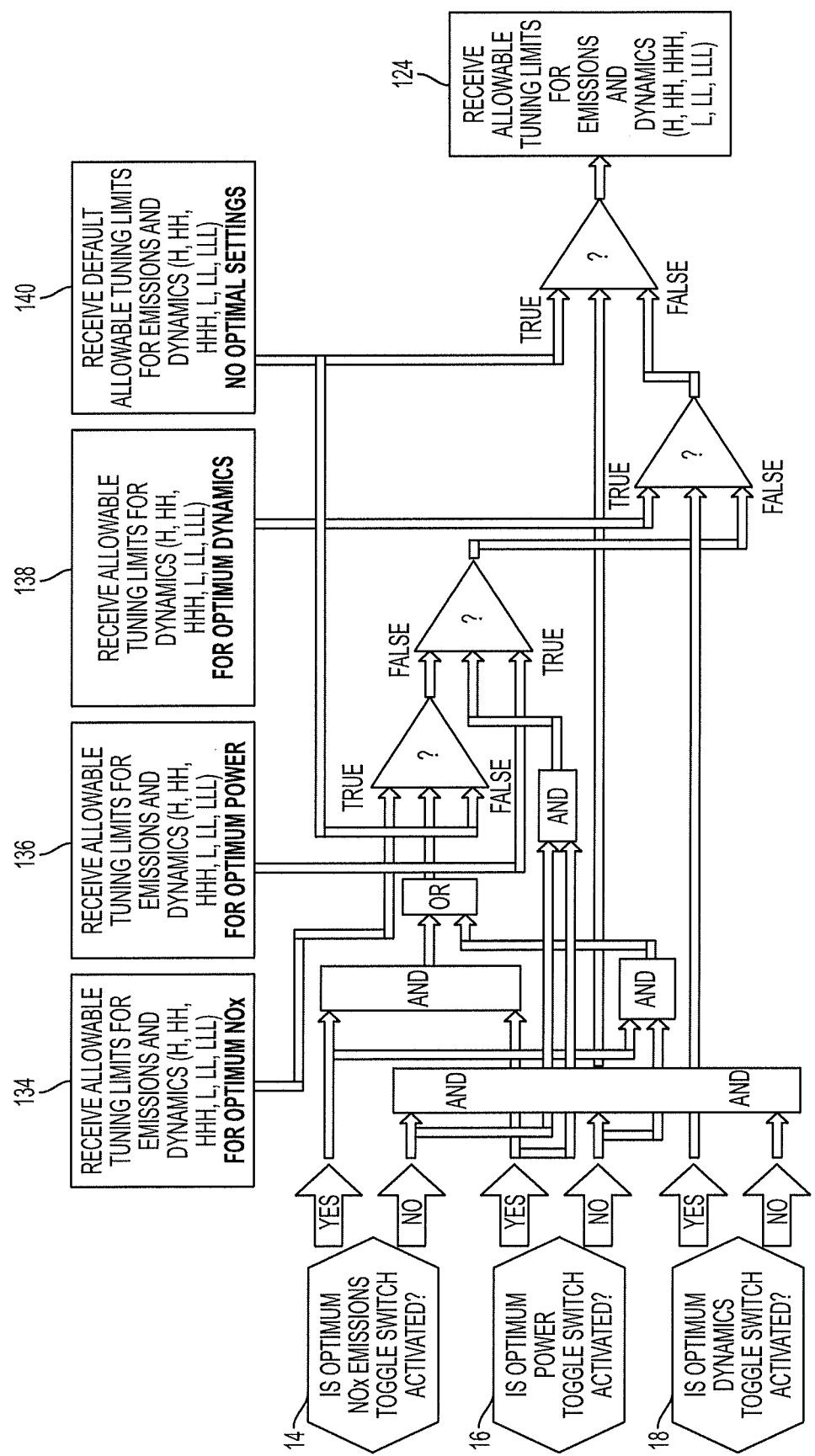
FIG. 6 shows an exemplary process overview of the steps to determine allowable turbine tuning parameters.

In FIG. 6, a flow chart is provided to explain how the allowable tuning limits 124 are determined. Once determined, the tuning limits 124 are compared to the operational data 120, 122 as set forth above and shown in FIG. 5. First, the User Interface Toggle Switches 14, 16, 18 corresponding to those in the interface display 12 of FIG. 3, are compared against each other, utilizing an internal hierarchy to allow passage of the alarm constraints relative to the most significant toggle switch. Thus, depending on which switches are in the "On" position, different tuning limits will be included in the allowable tuning limits 124. Each of Optimum NOx, Optimum Power and Optimum Dynamics has a collection of preset limits (denoted by the numerals 134, 136 and 138 in FIG. 6), depending on whether the corresponding toggle switch 14, 16, 18 is in the "On" of "Off" position. There is also an internal set of default limits 140 to be used when none of the toggle switches are in the "On" position. Additionally, if some or all of the User Interface Toggle Switches 14, 16, or 18 are selected "On", the Tuning Parameter Adjustment Interface 262 of FIG. 19 can be utilized by the user/operator in real-time, to adjust relevant tuning limits, with further internal controls to ensure valid limits are entered.

The internal hierarchy will determine which tuning limits shall take precedence in the event that competing toggle switches 14, 16 or 18 are in the "On" position. In the present example, the hierarchy ranks Optimum NOx above Optimum Power. Optimum Dynamics may be selected at any time and will simply alter the tuning limits of the other selections given, such as is shown in FIG. 4. If Optimum NOx 14 and Optimum Power 16 are both in the "On" position, the tuning limits for Optimum NOx 134 will be used. In addition to the internal tuning limits, the Tuning Parameter Adjustment Interface 262 of FIG. 19 can be used to change the actual High and Low NOx tuning limits 250, 252 in real-time. Additionally, the tuning limits for Optimum Dynamics 138 are utilized if this toggle switch 18 is activated. Likewise manual adjustment of the high Class 1 and Class 2 dynamics settings 254, 256 can be conducted manually using the Tuning Parameter Adjustment Interface 262 of FIG. 19. If no User Interface Toggle Switches 14, 16, 18 are active, default tuning limits 140 are provided as the allowable tuning limits 124, and the Tuning Parameter Adjustment Interface 262 of FIG. 19 will not be operable to change any of the tuning settings. All of the tuning limits 134, 136, 138 and 140 that may be used to construct the allowable tuning limits for the tuning controller 10 may be developed by the end user and programmers and can be hard coded into the tuning controller 10 or real-time adjusted in real time using the Tuning Parameter Adjustment Interface 262, provided some Optimization Criteria 14, 16, 18 are selected "On", for a given application. The methodology outlined in FIG. 6 is meant to provide an exemplary framework for incorporation of a number of different User Interface Toggle Switches and tuning parameter adjustment control devices, such as those options set forth above with respect to FIGS. 3 and 19, whereby only a subset are specifically outlined in this disclosure.

Figure 7:
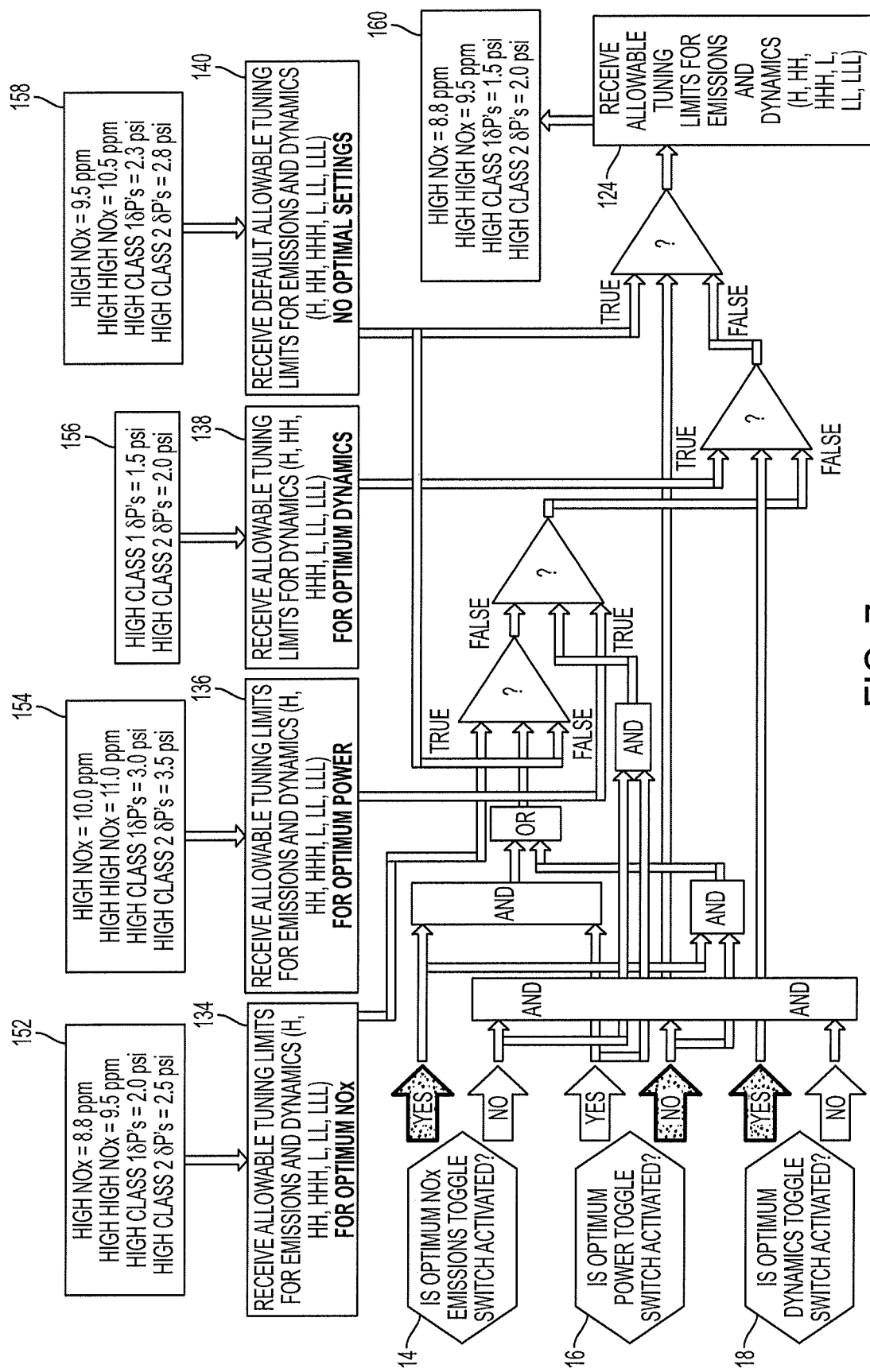
FIG. 7 shows a further detailed exemplary process according to the steps shown in FIG. 6.

FIG. 7 shows a specific example of the flow chart of FIG. 6 given for the determination of a subset of the system's allowable tuning limits. In this example, the tuning limits for High NOx, High High NOx, High Class 1 OP's, High Class 2 OP's will be determined based on preset tuning limits and the user's preferences. The various exemplary tuning limits are provided for Optimum NOx 134, Optimum Power 136, Optimum Dynamics 138, and No Optimal Settings 140 are given corresponding numerical values (shown respectively in blocks 152, 154, 156 and 158). The corresponding numerical values given for each criterion vary, such that the allowable limits 124 will be different depending on which toggle switches 14, 16 or 18 are selected and associated manual tuning settings are manipulated using their respective Tuning Parameter Adjustment Interface 262 control devices 250, 252, 254, 256. By way of example, the Optimum NOx 134, 152 and Optimum Power 136, 154 give limits for NOx, but also provide limits for Dynamics that are to be used in the event that Optimum Dynamics 138, 156 is not selected. However, in the event that the Optimum Dynamics toggle 18 is selected, the Class 1 OP's and Class 2 OP's values provided therefor 156 shall be used instead of the values listed with respect to Optimum NOx 134, 152 and Optimum Power 136, 154.

In this particular example, the toggle switches for Optimum NOx 14 and Optimum Dynamics 18 are selected, with the switch for Optimum Power 16 left in the "Off" position. Thus, the values from Optimum NOx for High NOx and High High NOx 152 are provided. Also, because Optimum Dynamics 18 is also selected, the Dynamics values for High Class 1 OP's and High Class 2 OP's 138, 156 replace those OP's values provided with respect to Optimum NOx 134, 152. As a result, the allowable tuning limits 124 are provided as shown in block 160. These allowable tuning limits 124 correspond to those used in FIG. 5, as described above, to determine whether information from the CEMS 40 and CDMS 50 is in an alarm state or operating normally. As mentioned above, because the toggle switches for Optimum NOx 14 and Optimum Dynamics 18 are selected, the High NOx 250, Low NOx 252, High Class 1 Dynamics 254, and High Class 2 Dynamics 256 control settings from the Tuning Parameter Interface Display 262 of FIG. 19 may be used to alter the values for the High NOx, High Class 1 and Class 2 Dynamics settings 124, 160 of FIG. 7.

FIG. 8, shows a schematic for the process of incorporating a user's priorities and the "True" alarm conditions received for determining the dominant tuning concern 106. It is this tuning concern 106 which dictates the turbine operational changes the turbine controller 10 performs, as shown in FIG. 2.

First, a determination is made of all potential dominant tuning issues 142. These include, but are not limited to: combustor blowout, CO emissions, NOx emissions, Class 1 combustor dynamics (Class 1 $61^3$'s), and Class 2 combustor dynamics (Class 2 $61^3$'s). The list of potential dominant tuning issues 142 is determined by the user and programmer and may be based on a number of factors or operational criteria. By way of example, Class 1 and Class 2 combustor dynamics 6P's refer to combustion dynamics occurring over specific ranges of acoustic frequencies, whereby the range of frequencies is different between Classes 1 and 2. Indeed, many combustion systems can possess different acoustic resonant frequencies corresponding to Class 1 and Class 2, and variations in these two dynamics classes may be mitigated utilizing different turbine operational parameter changes for each different turbine and/or combustor arrangement. It should also be noted that certain combustion systems may have none, 1, 2, or greater than 2 different "classes" (frequency ranges) of combustor dynamics which can be tuned. This disclosure utilizes a system whereby two different combustor dynamics classes are mentioned. However, it is fully intended that this disclosure can be broadly applied to any number of distinct dynamics frequency classes (from 0 to greater than 2).

After determination of the potential dominant tuning issues 142, these issues are ranked in order of significance 144 according to the end user's needs as well as the detrimental effects that each tuning concern can have on the environment and/or turbine performance. The relative importance of each potential dominant tuning concern can be different with each end user, and for each combustor arrangement. For example, some combustion systems will demonstrate an extreme sensitivity to combustor dynamics, such that normal daily operational parameter variations can cause a normally benign dynamics tuning concern to become catastrophic in a very short amount of time. In this case, one or both of the dominant dynamics tuning concerns (Class 1 and Class 2) may be elevated to Priority 1 (Most Important). By way of example in FIG. 7, combustor blowout is listed as the most important Dominant Tuning Concern 144. This ranking is used to determine the dominant tuning concern in the event that there are multiple alarms with equal levels of severity. This ranking of Dominant Tuning Concerns 144, from most to least important, provides the overall framework where the specific Boolean Logic Hierarchy 148 is created. For example, assuming Class 1 and Class 2 OP's obey generally monotonic behavior relative to perturbations in system operational parameters, a High-High "HH" Class 2 OP's alarm may be more significant than High "H" Class 1 6P's alarm. Additionally, in the example given in FIG. 8 for the Boolean Logic Hierarchy 148, High "H" NOx emissions is more significant than High "H" Class 2 dynamics. This means that if both High "H" NOx and High "H" Class 2 dynamics are both "in alarm" (Logic=True), in the absence of other alarms being "True", the autotuning system will tune for High "H" NOx because it is the dominant tuning concern. Finally, it can be seen that Blowout is ranked above NOx Emissions and both are ranked above Class 1 $61^3$'s. Thus, if there were high "H" alarms returned for all three categories, Blowout would be the dominant tuning concern, followed by NOx Emissions and then Class 1 OP's. This Boolean Logic Hierarchy 148 will be what is compared to the "True" alarms 130 returned by comparing the allowable tuning limits 124 to the operational data 120, 122 as set forth above with respect to FIG. 5.

All "True" tuning alarms 130 are provided as ranked by severity (e.g. HHH above HH, etc.). The "True" tuning alarms 130 are then compared with the hard-coded Boolean Logic Hierarchy 148, in step 150 to determine which tuning will become the "True" Dominant Tuning Concern 106. This one "True" Dominant Tuning Concern 106 is now passed into the remainder of the autotuning algorithm, as detailed in FIG. 2, as the Dominant Tuning Concern 106 to be mitigated by operational changes.

Figure 9:
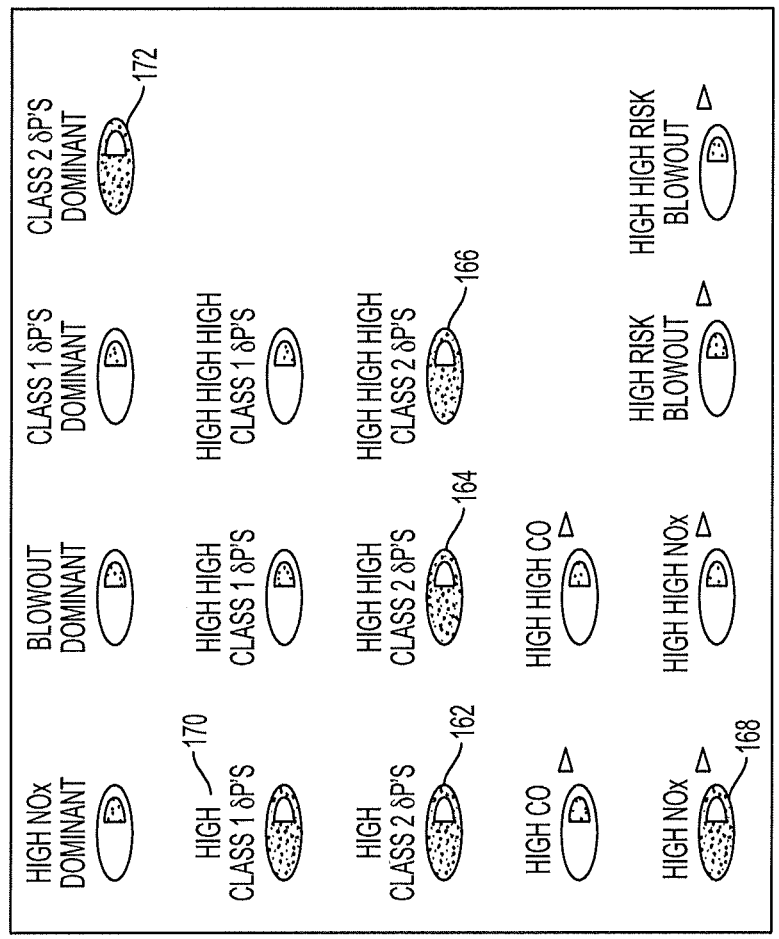
FIG. 9 shows a first example schematic of the determination of the system's dominant tuning concern, given various alarm inputs into the present disclosure.

FIGS. 9-12 provide exemplary visual representations of the autotuning system interface depicting how the Boolean Logic Hierarchy works in practice. FIG. 9 shows the alarms returned in connection with the example set forth above with respect to FIG. 8. Namely, alarms are returned for Class 2 OP's at the levels of H 162, HH 164 and HHH 166. In addition, alarms for NOx 168 and Class 1 SP's 170 are returned at the H level. Since more extreme levels trump conflicts of different alarms at the same level, the HHH Class 2 OP's is the priority and therefore the dominant tuning concern 172.

Figure 10:
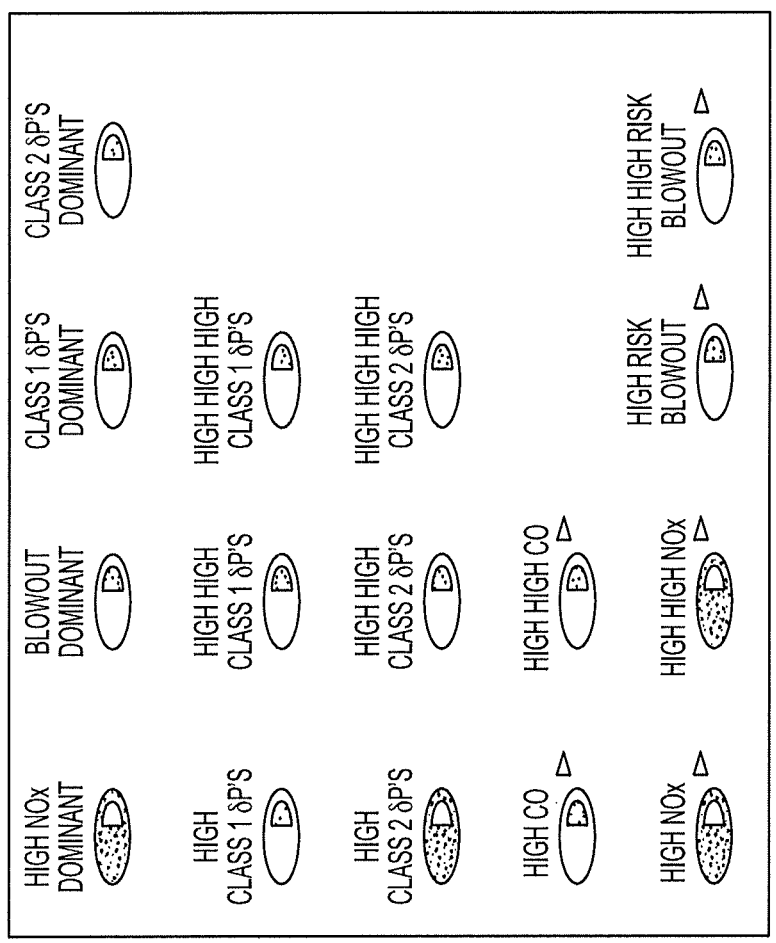
FIG. 10 shows a second example schematic of the determination of the system's dominant tuning concern, given various alarm inputs into the present disclosure.
Figure 11:
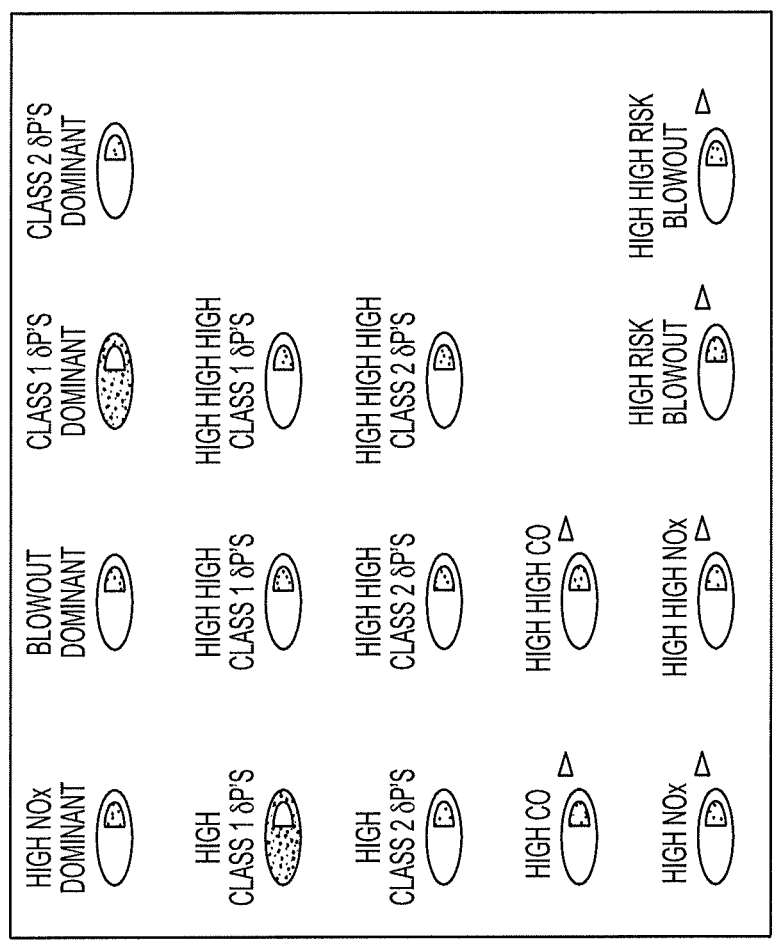
FIG. 11 shows a third example schematic of the determination of the system's dominant tuning concern, given various alarm inputs into the present disclosure.
Figure 12:
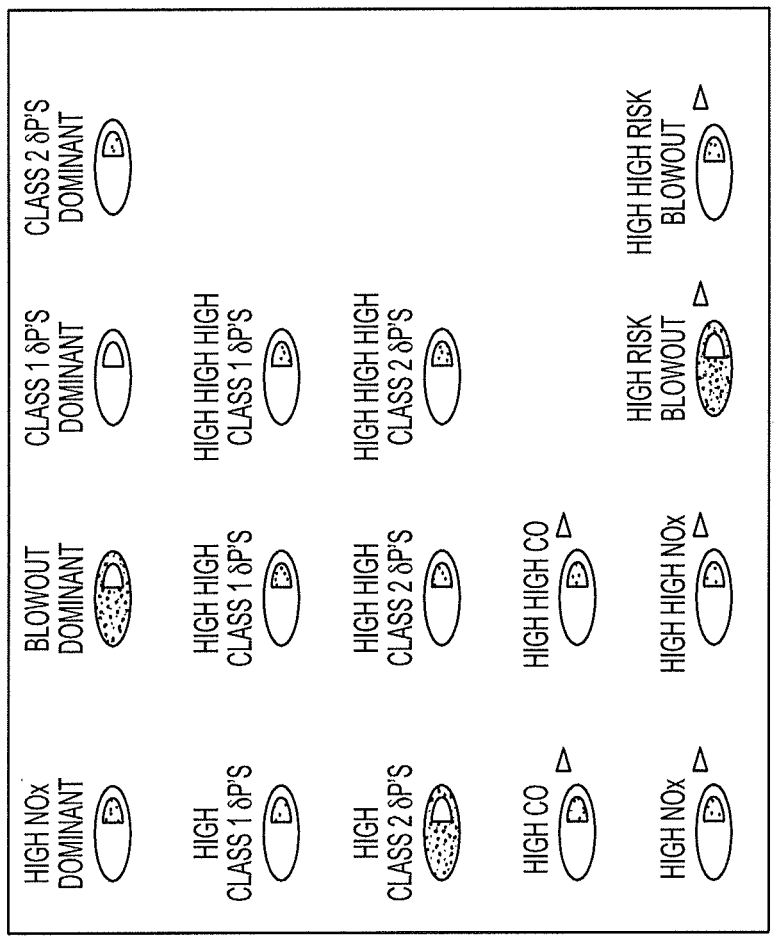
FIG. 12 shows a fourth example schematic of the determination of the system's dominant tuning concern, given various alarm inputs into the present disclosure.

FIGS. 10-12 show various further examples of the dominant tuning concern for different "True" alarm levels under the user defined hierarchy 144 of FIG. 8. FIG. 10 shows a NOx alarm at the HH level returned, with no other alarms of this severity. Thus, high NOx is the dominant tuning concern. FIG. 11 shows a Class 1 OP's at an H level as the only alarm condition, thus making Class 1 OP's as the dominant tuning concern. Finally, FIG. 12 shows that Class 2 OP's and Blowout both return alarms at the H level. Referring to the user ranking of dominant tuning issues 144 in FIG. 8, Blowout is ranked as a priority above Class 2 $61^3$'s and thus, although the severity of the alarms is equal, Blowout becomes the dominant tuning concern.

Figure 13:
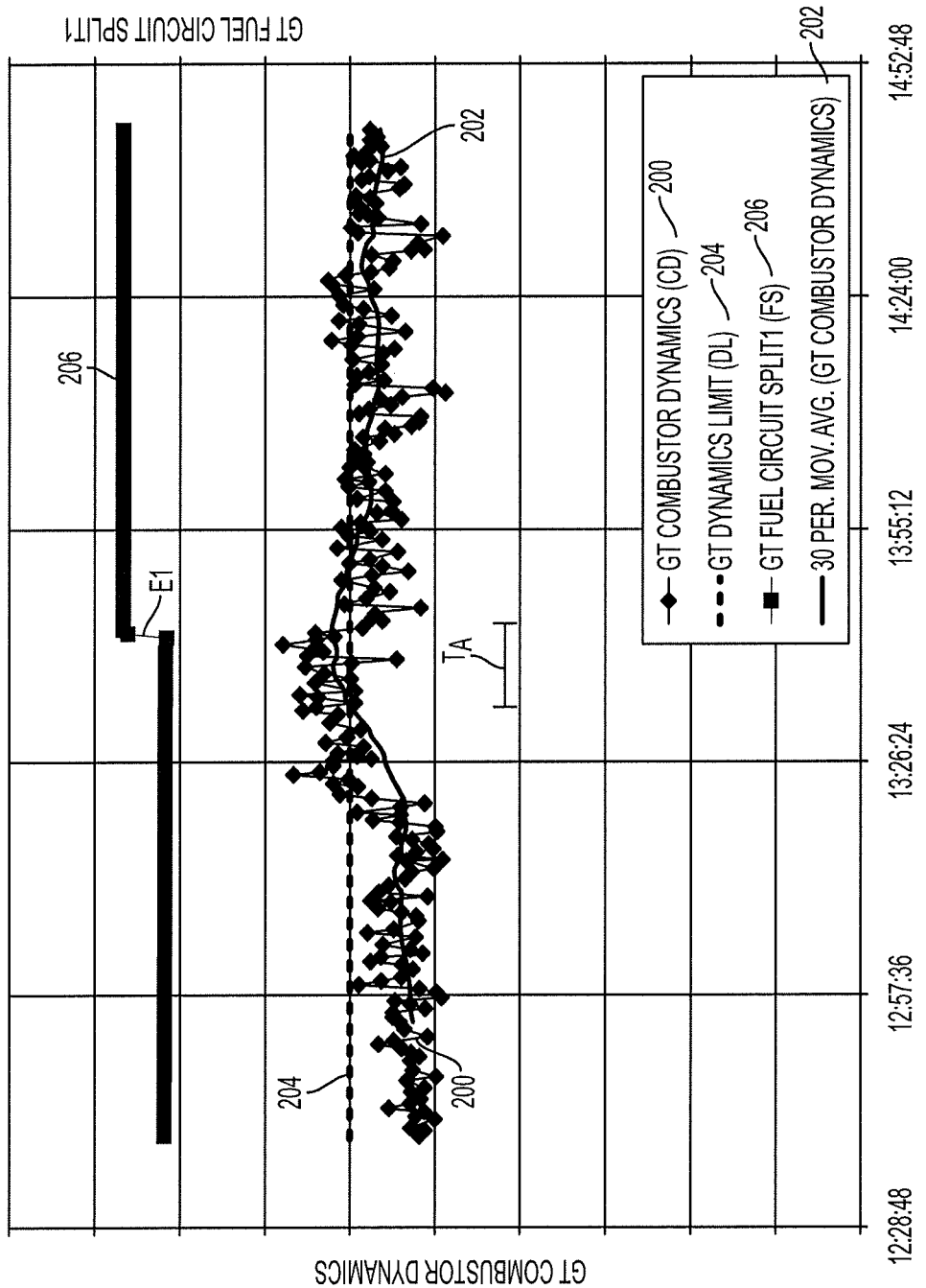
FIG. 13 shows a first operational example of operational tuning of a gas turbine engine system as contemplated by the present disclosure.

In FIGS. 13-16, there is shown various examples of the operational results of a tuning operation of a tuning controller of the present disclosure based on operational data from a running turbine system. In FIG. 13, the dominant tuning concern is high Class 2 $61^{3}$'s, and a change in the combustor fuel split E1 is made in reaction to a high Class 2 OP's alarm generated when the combustor dynamics moves outside of the set operational priorities for optimum dynamics. The actual combustor dynamics data received by the turbine controller 10 from, for example, the CDMS 50 is designated as 200 in the graph. The moving average for the combustor dynamics is identified in the graph as 202. When the combustor dynamics exceed the dynamics alarm limit value 204 for a set period of time TA an alarm goes off within the tuning controller. This alarm causes the first event E1 and a resulting incremental adjustment in the combustor fuel split tuning parameter 206. As illustrated, the incremental increase in the fuel split causes a corresponding drop in the combustor dynamics 200, with the average combustor dynamics 202 dropping below the dynamics alarm limit 204. As time continues, the tuning is held by the tuning controller and the average combustor dynamics 202 maintains its operational position below the dynamics limit 204. Thus, no further adjustments necessary or alarms issued.

Figure 14:
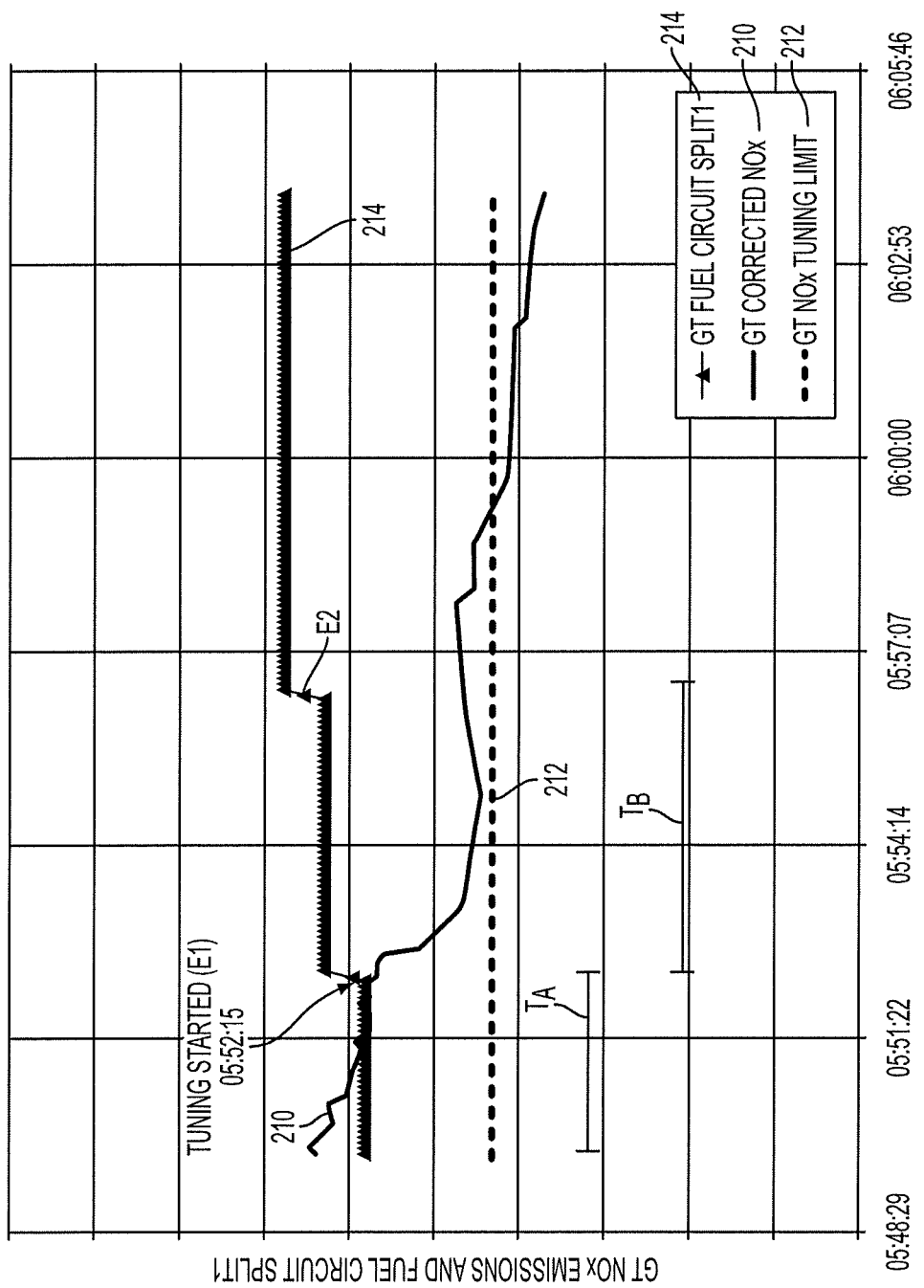
FIG. 14 shows a second operational example of operational tuning of a gas turbine engine system as contemplated by the present disclosure.

In FIG. 14, the dominant tuning concern is high NOx emissions. As NOx emissions data 210 is received from the tuning controller, an alarm is generated after the passage of time TA. The alarm is caused by the NOx emissions 210 exceeding the operational standard or tuning limit 212. The alarm activates a first event E1 resulting in an incremental increase in the fuel split 214. After a period of time TB from the first event E1, the NOx alarm is still activated due to the NOx emissions 210 exceeding the preset tuning limit 212. This continued alarm after time TB causes a second event E2 and a second incremental increase in the fuel split value 214. This second increase is equal in magnitude to the first incremental increase. The second event E2 causes the NOx emissions level 210 to drop below the preset limit 212 within the review time period and halts the alarm. As the NOx emissions 210 remains below the limit 212, the fuel split 214 tuning is held and the operation of the turbine continues with the defined operational parameters.

Figure 15:
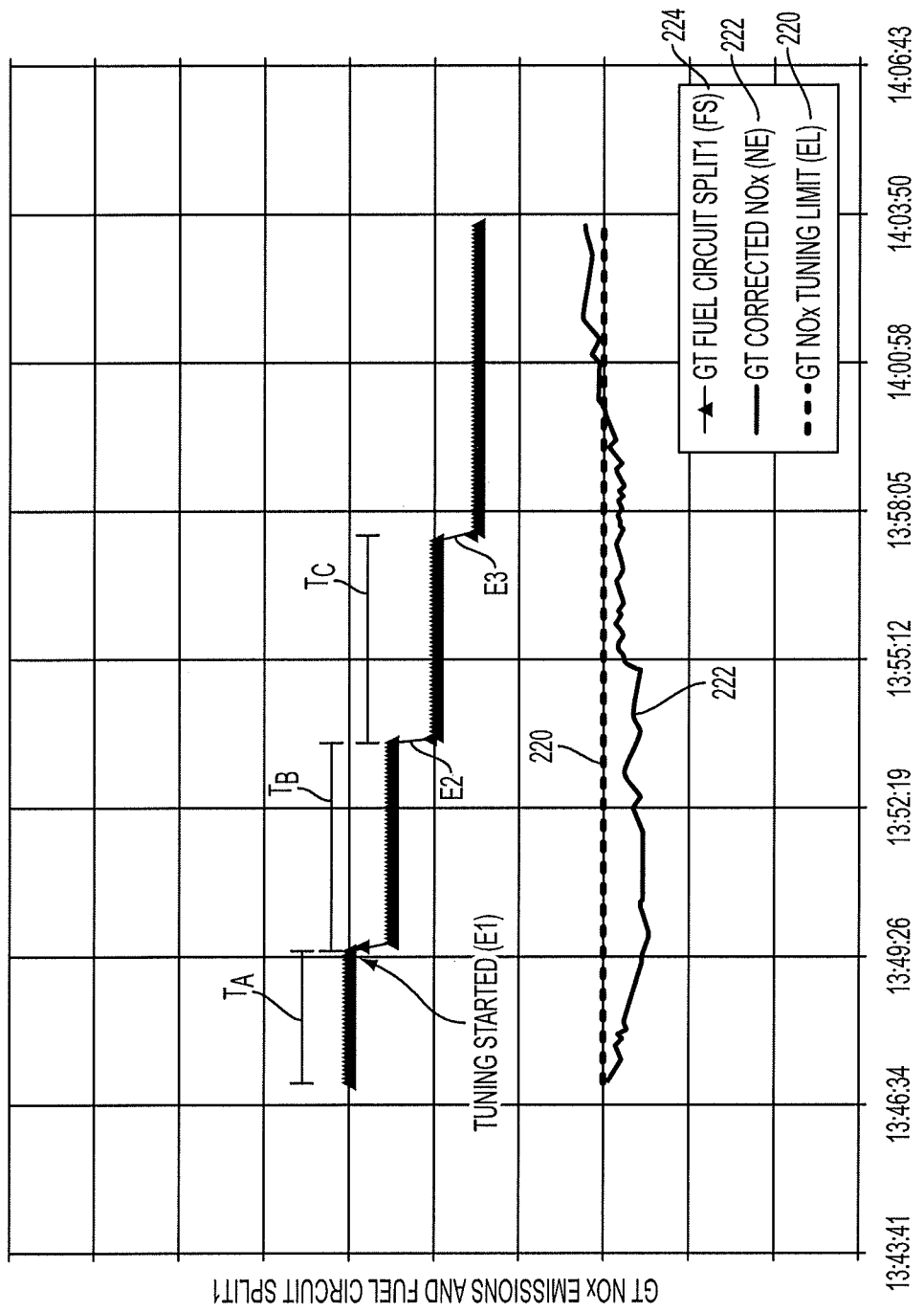
FIG. 15 shows a third operational example of operational tuning of a gas turbine engine system as contemplated by the present disclosure.

In FIG. 15, the dominant tuning concern is low NOx emissions/Blowout, with the alarm created by a low reading received by tuning controller. As shown, the NOx tuning limit 220 is defined. Upon passage of the set time period TA from receiving NOx level data 222, the alarm is generated and a first event E1 occurs. At the first event E1, the fuel split level 224 is incrementally adjusted downward. After a set passage of time TB from event E1 additional NOx emissions data 222 is received and compared to the preset alarm level 220. Because the NOx is still below the alarm level 220, a second event E2 occurs resulting in a further incremental reduction in the fuel split value 224. A further passage of time TC from event E2 occurs and additional data is received. Again, the NOx data 212 is low, maintaining the alarm and resulting in a further event E3. At event E3, the fuel split value 224 is again reduced by the same incremental amount. This third incremental adjustment results in the NOx emissions 222 rising above the preset limit 220 and results in removal of the alarm. The fuel split 224 tuning value set after event E3 is held in place by the tuning controller 10.

Figure 16:
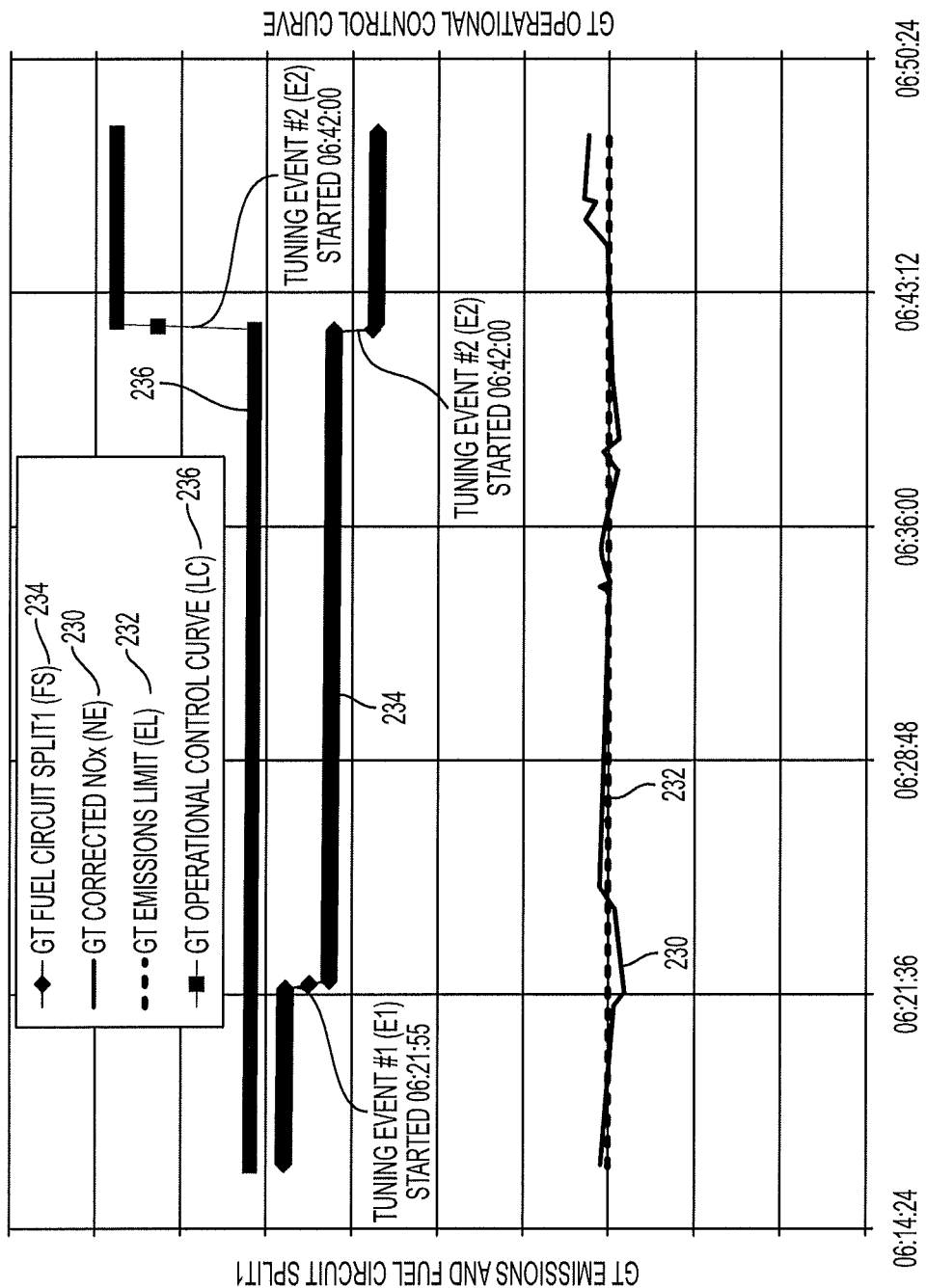
FIG. 16 shows a fourth operational example of operational tuning of a gas turbine engine system as contemplated by the present disclosure.

In FIG. 16, the NOx emissions data 230 received by the tuning controller 10 is again tracking along the lower emissions limit 232, resulting in a low NOx/Blowout dominant tuning concern. At the first tuning event E1, the fuel split value 234 is incrementally dropped to result in a corresponding increase in the NOx emissions 230 over the lower limit 232. After this first incremental adjustment, the NOx emissions for a period of time holds above the limit 232 and then begins to again fall. At the second tuning event E2, the fuel split value 234 is again adjusted by the designated fixed incremental value. This second adjustment then places the fuel split value 234 at its defined minimum within the preset range of allowable values (determined as a hard coded limit within the tuning controller 10). Because this limit is reached, the tuning operation moves to the next operational parameter, which is normally the second fuel circuit adjustment. In the example provided, this second circuit value (not shown) is already at its set maximum/minimum and is therefore not adjusted. Thus, the tuning operation moves on to the next operational parameter, load control curves 236. As shown, at event E2 an incremental adjustment is made in the load control curve value 236. The increase in the load control curve value (turbine fuel to air ratio) 236 results in a corresponding increase in the NOx emission 230 to a value above the minimum 232 and removes the alarm. Upon removal of the alarm, the tuning settings are held and no further adjustments are made. The tuning controller 10 then proceeds to receive data from the sensor means, through the DCS, and continues to make comparisons with the set operational standards (including the minimum NOx emissions limit EL).

Figure 17:
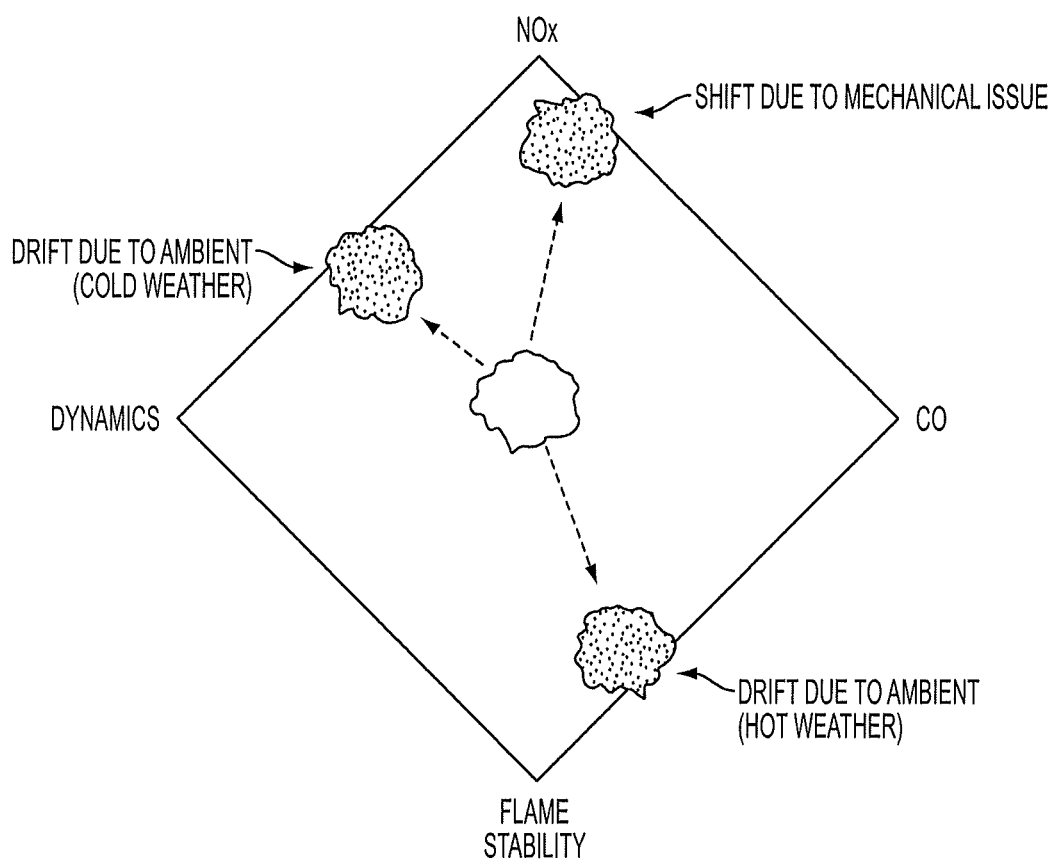
FIG. 17 shows a first exemplary schematic representation of the function of the tuning controller of the present disclosure in maintaining the tuning of the turbine system.
Figure 18:
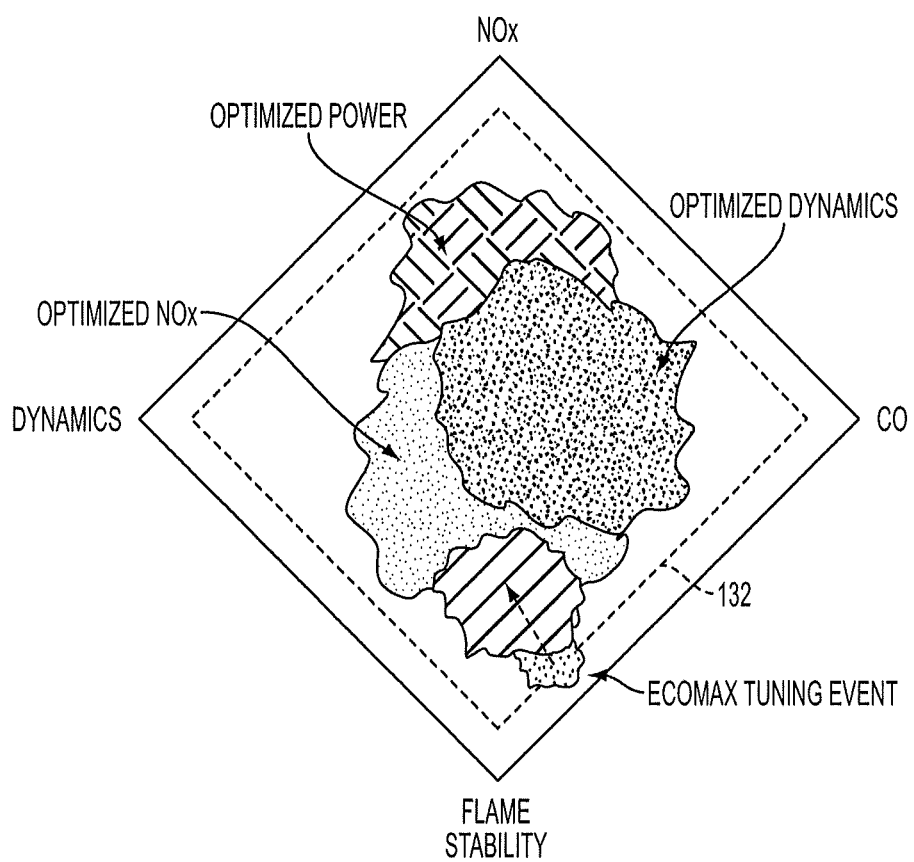
FIG. 18 shows a second exemplary schematic representation of the function of the tuning controller of the present disclosure in maintaining the tuning of the turbine system.

FIGS. 17 and 18 are examples of schematic representations of the operation of the tuning controller within contemplated disclosure. The operation of the turbine is defined by the emission output of the turbine, both NOx and CO, turbine dynamics and flame stability. In FIG. 17, a tuned system is defined by a preferred operating envelope in the center of the operational diamond. This preferred operational envelope is typically manually set based on a prior start-up or operation of the turbine system. However, weather changes, both hot and cold, and mechanical changes within the turbine system cause a drift within the operational diamond. Hence a tuning is desired so as to maintain the turbine operation within the preferred range.

In FIG. 18, a defined buffer or margin 132 is set within the operational diamond to serve as a warning for a drift of the turbine operation outside of the preferred operational envelope. Once one of the sensed operational values reaches the defined buffer line or limit, an alarm is generated, causing a tuning event. Based on the direction of the drift, the tuning controller creates a preset reaction to meet the specifics of the tuning need. This preset reaction is a defined incremental shift in an operational control element of the turbine as a means for moving the turbine operational envelope back into the desired range, and away from the buffer limit. It should be noted that each parameter may have more than one alarm, such as high "H"; high-high "HH" and high-high-high "HHH." These alarms may be sequentially located around the diamond shown to alert operators of how close the turbine operation is to the outside of desired operational limits.

Figure 19:
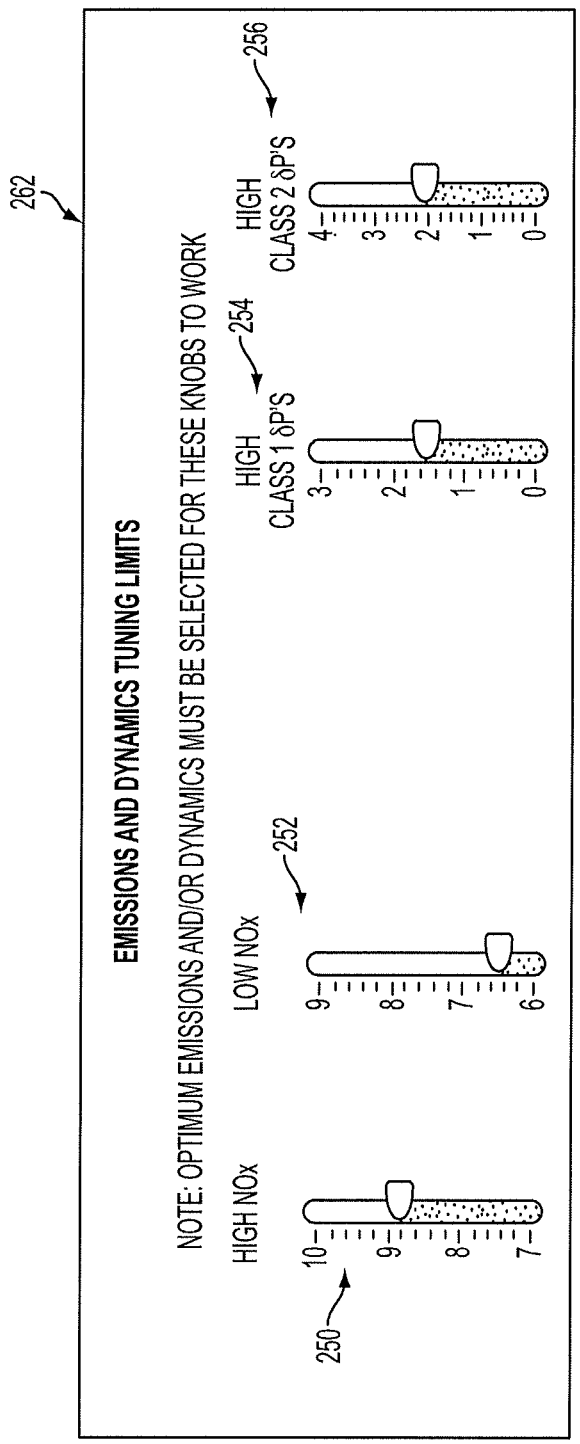
FIG. 19 shows an exemplary embodiment of the tuning parameter adjustment interface, whereby control elements are utilized for real-time turbine control setting changes within the present disclosure.

FIG. 19 delineates the Tuning Parameter Adjustment Interface 262, whereby the user/operator can adjust the tuning parameters in real-time to meet their respective operational goals, The Tuning Parameter Adjustment Interface 262 is preferably a graphical user interface, such as a computer monitor or other screen that may be operable using a computer mouse, track ball or touch screen technology. The tuning parameters are adjusted by sliding the respective parameter adjustment control device up/down, whereby the maximum and minimum limits for each tuning parameter can be programmatically modified as desired. Each tunable parameter control device 250, 252, 254, 256 is independent of any of the other parameters. For instance, manually adjusting High NOx 250 has no direct influence on the High Class 1 dynamics limits 254. Activation of these tuning parameter adjustments is achieved only with an "On" or "True" Boolean setting for their respective turbine Operational Priorities 14, 16, 18, as identified in FIG. 3. For instance, Selecting Optimum NOX Emissions 14, shown in FIG. 3, "On" activates the ability to manually adjust High NOx 250 and Low NOx 252 only. Alternatively, selecting Optimum Dynamics 18, shown in FIG. 3, "On" allows manual adjustment of High Class 1 Dynamics 254 and High Class 2 Dynamics 256 only.

The present disclosure has been described and illustrated with respect to a number of exemplary embodiments thereof. It should understood by those skilled in the art from the foregoing that various other changes, omissions and additions may be made therein, without departing from the spirit and scope of the present disclosure, with the scope of the present disclosure being described by the foregoing claims.

The invention claimed is:

1. A tuning system for tuning the operation of a gas turbine, the system comprising:
   operational turbine controls for controlling operational control elements of the turbine, the operational control elements producing a change in operational parameter data of the gas turbine;
   a tuning controller communicating with the operational turbine controls to adjust one or more operational control element, the tuning controller configured to tune the operation of the turbine in accordance with the following:
      receiving real-time or near real-time operational parameter data about the turbine,
      adjusting one or more tuning priorities within a range to change stored operational standards, the stored operational standards in the form of tuning alarm levels,
      determining whether sensed operational parameter data is within the stored operational standards and producing one or more indicators if said operational data is not within the stored operational standards,
      ranking the one or more indicators based on the hierarchy of tuning priorities to determine the dominant tuning concern,
      determining whether the one or more indicators has continued for a predetermined period of time; and
      tuning the operation of the turbine by causing an adjustment in one of the operational control element, wherein the operational control element being adjusted is selected based on the dominant tuning concern.

2. The tuning system according to claim 1, further comprising at least one sensor for sensing the operational parameters of the turbine, wherein the operational parameters include at least one of combustor dynamics or turbine exhaust emissions.

3. The tuning system according to claim 1, wherein the one or more indicators are ranked based on the severity of each indicator.

4. The tuning system according to claim 3, wherein the one or more indicators are further ranked based on the tuning priorities, such that indicators of the same magnitude are ranked based on the tuning priorities.

5. The tuning system according to claim 1, wherein tuning the operation of the turbine based on dominant tuning concern comprises making incremental adjustments in one or more operational control elements of the turbine.

6. The tuning system according to claim 1, wherein the one or more indicators comprises one or more alarm levels indicating that the operational data of the turbine is outside of allowable limits of the turbine.

7. The tuning system according to claim 1, wherein the tuning priorities for the turbine comprise one or more selected from the group comprising NOx levels, power level, and combustion dynamics.

8. The tuning system according to claim 1, wherein the tuning controller communicates indirectly with the turbine controller through a distribution control system (DCS) or similar control system.

9. The tuning system according to claim 1, wherein the tuning controller communicates directly with the turbine controller.

10. The tuning system according to claim 1, further comprising a user interface operable to adjust tuning parameter limits during operation of the tuning system.

11. The tuning system according to claim 1, wherein the operational control elements comprise one or more of turbine fuel distribution splits of the fuel circuits of the combustors, fuel gas inlet temperature, and fuel/air ratio within the turbine.

12. A method of tuning the operation of a gas turbine, the turbine having turbine controls for controlling operational control elements of the turbine, the operational control elements producing a change in operational parameter data of the gas turbine, the method comprising:
   receiving real-time or near real-time operational parameter data about the turbine,
   adjusting one or more tuning priorities within a range to change stored operational standards, the stored operational standards in the form of tuning alarm levels,
   determining whether sensed operational parameter data is within the stored operational standards and producing one or more indicators if said operational data is not within the stored operational standards,
   ranking the one or more indicators based on the hierarchy of tuning priorities to determine the dominant tuning concern,
   determining whether the one or more indicators has continued for a predetermined period of time; and
   tuning the operation of the turbine by causing an adjustment in one of the operational control element, wherein the operational control element being adjusted is selected based on the dominant tuning concern.

13. The method according to claim 12, wherein the one or more indicators are ranked based on the severity of the indicator.

14. The method according to claim 13, wherein the one or more indicators are further ranked based on the tuning priorities, such that indicators of the same magnitude are ranked based on the tuning priorities.

15. The method according to claim 12, wherein step of tuning the operation of the turbine based on dominant tuning concern comprises making incremental adjustments in one or more operational control elements of the turbine.

16. The method according to claim 12, wherein the tuning priorities comprise one or more selected from the group comprising NOx levels, power level and combustion dynamics.

17. The method according to claim 12, wherein real-time adjustment of tuning limits is achieved through the use of a graphical user interface during operation of the turbine.

18. The method according to claim 12, wherein the operational control elements comprise one or more of turbine fuel distribution splits of the fuel circuits of the combustors, fuel gas inlet temperature, and fuel/air ratio within the turbine.

19. A non-transitory computer readable medium having embodied therein a computer program for tuning the operation of a combustion turbine comprising code segments for:
controlling operational control elements of the turbine, the operational control elements producing a change in operational parameter data of the gas turbine,
receiving real-time or near real-time operational parameter data about the turbine,
adjusting one or more tuning priorities within a range to change stored operational standards, the stored operational standards in the form of tuning alarm levels,
determining whether sensed operational parameter data is within the stored operational standards and producing one or more indicators if said operational data is not within the stored operational standards,
ranking the one or more indicators based on the hierarchy of tuning priorities to determine the dominant tuning concern,
determining whether the one or more indicators has continued for a predetermined period of time; and
tuning the operation of the turbine by causing an adjustment in one of the operational control element, wherein the operational control element being adjusted is selected based on the dominant tuning concern.

20. The computer readable medium according to claim 19, wherein the tuning priorities comprise one or more selected from the group comprising NOx levels, power level and combustion dynamics.

21. The computer readable medium according to claim 19, wherein the one or more indicators are ranked based on the severity of the indicator and wherein the indicators are further ranked based on the tuning priorities, such that indicators of the same magnitude are ranked based on the tuning priorities.

22. The computer readable medium according to claim 19, wherein tuning the operation of the turbine comprises making incremental adjustments of at least one operational control element of the turbine.

23. The computer readable medium according to claim 19, wherein real-time adjustment of tuning limits is achieved through the use of a graphical user interface.

24. The computer readable medium according to claim 19, wherein the operational control elements comprise one or more of turbine fuel distribution splits of the fuel circuits of the combustors, fuel gas inlet temperature, and fuel/air ratio within the turbine.

* * * * *